US012812379B2

(12) United States Patent
Liu

(10) Patent No.: US 12,812,379 B2
(45) Date of Patent: Nov. 24, 2026

(54) METHOD IN THE SYSTEM OF SECURING SMS MESSAGE VIA AUTHENTICATING THE SMS SENDER'S IDENTITY AND VERIFYING THE INTEGRITY OF THE SMS MESSAGE WITH DISPLAYING THE RESULTS ON TO READER'S GUI AT REALTIME

(71) Applicant: Jian Liu, Hayward, CA (US)

(72) Inventor: Jian Liu, Hayward, CA (US)

( * ) Notice: Subject to any disclaimer, the term of this patent is extended or adjusted under 35 U.S.C. 154(b) by 136 days.

(21) Appl. No.: 18/471,059

(22) Filed: Sep. 20, 2023

(65) Prior Publication Data

US 2024/0414541 A1 Dec. 12, 2024

Related U.S. Application Data

(60) Provisional application No. 63/507,189, filed on Jun. 9, 2023.

(51) Int. Cl.

| | |
|---|---|
| ***H04L 29/06*** | (2006.01) |
| ***G06F 21/00*** | (2013.01) |
| ***H04L 9/32*** | (2006.01) |
| ***H04W 12/033*** | (2021.01) |
| ***H04W 12/106*** | (2021.01) |
| *H04W 4/14* | (2009.01) |

(52) U.S. Cl.

CPC ......... *H04W 12/106* (2021.01); *H04L 9/3236* (2013.01); *H04W 12/033* (2021.01); *H04W 4/14* (2013.01)

(58) Field of Classification Search

CPC ... H04W 12/106; H04W 12/033; H04W 4/14; H04L 9/3236

See application file for complete search history.

(56) References Cited

U.S. PATENT DOCUMENTS

| | | | | |
|---|---|---|---|---|
| 6,819,932 | B2 | 11/2004 | Allison et al. | |
| 8,082,446 | B1 * | 12/2011 | Carroll | H04L 9/3247 713/176 |
| 10,327,142 | B2 | 6/2019 | Mardikar | |
| 11,449,584 | B1 * | 9/2022 | Pamucci | H04L 9/0897 |
| 2014/0004892 | A1 | 1/2014 | Murynets et al. | |
| 2015/0046996 | A1 | 2/2015 | Slaby et al. | |
| 2017/0118618 | A1 | 4/2017 | Jin et al. | |
| 2017/0206545 | A1 * | 7/2017 | Gupta | H04L 51/212 |

* cited by examiner

*Primary Examiner* — Lisa C Lewis

(57) ABSTRACT

Disclosed herein is a method of facilitating secure SMS messaging, in accordance with some embodiments. Accordingly, the method may include receiving an information from at least one sender device associated with a message sender, retrieving a verifying information associated with the message sender based on the sender indication and identification, analyzing the information and the verifying the integrity of information, generating a verification result associated with the message sender's identity and the message hash values, obtaining an augmenting information, and transmitting the augmenting information and the information to at least one vendor device associated with at least one message vendor. Then, most importantly, display the verification results on to the SMS message reader's GUI for more securer operation thereafter to fight against the attacks such as illegal impersonation, forgery, scam, spam, virus, warm, bullying, imitating, phishing, sabotage, espionage, whaling, vishing, solicitation, ransomware, tempering, and message manipulation.

4 Claims, 25 Drawing Sheets

METHOD IN THE SYSTEM OF SECURING SMS MESSAGE VIA AUTHENTICATING THE SMS SENDER'S IDENTITY AND VERIFYING THE INTEGRITY OF THE SMS MESSAGE WITH DISPLAYING THE RESULTS ON TO READER'S GUI AT REALTIME

FIELD OF THE INVENTION

Generally, the present disclosure relates to the field of data processing. More specifically, the present disclosure relates to method in the system for facilitating secure messaging via a realtime data analysis and display the result to data user.

BACKGROUND OF THE INVENTION

The field of data processing is technologically important to several industries, business organizations, and/or individuals. In particular, the use of data processing is prevalent for secure messaging activities.

Nowadays, electronic Short Message Service (SMS) messaging is one of the most popular methods of communication between people. Electronic messaging can be performed using various services and protocols over different electronic devices including, but not limited to, smartphones, computers, etc. Due to the popularity of electronic SMS messaging, various bad actors have risen to take advantage of the technology. For example, the number of spam messages people receive has increased in the last couple of years. Most spam messages can include dangerous content that may result in attacks on the person's electronic device or even identity theft. So, a growing need for sender verification has pushed companies and organizations to provide additional security services to protect message recipient (receiver and/or reader) via fighting against illegal impersonation, forgery, scam, spam, virus, warm, bullying, imitating, phishing, sabotage, espionage, whaling, vishing, solicitation, ransomware, tempering, and message manipulation. However, most services currently available fail to properly protect message recipients from most of the potentially dangerous messages without verifying nor displaying the result to the recipient. Many technologies are available that help bad actors send messages as if the messages came from legitimate sources. Unfortunately, the services currently available fail to detect those messages.

Therefore, there is an urgent need for a unique method with logical procedures in verifying the identity of the SMS message sender and in verifying the integrity of the message within the system for facilitating secure messaging that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein are the method and the system of securing Short Message Service (SMS) message via authentication on the sender's digital identification (aka, digital certificate, or public key certificate) and verification of the integrity of the SMS message with display the results on to readers Graphical User Interface (GUI) along with some embodiments. Accordingly, the methods may include receiving, using a communication device, an information from at least one sender device associated with a message sender. Further, the information may include a sender indication and identification associated with the message sender. Further, the information may include a message content and a first hash value associated with a message. Further, the methods may include retrieving, using a storage device, verifying information associated with the message sender based on the sender indication. Further, the methods may include analyzing, using a processing device, the information, and the verifying information. Further, the methods may include obtaining, using the processing device, a secret key associated with the message sender based on the analyzing. Further, the methods may include hashing, using the processing device, the message content using the secret key. Further, the methods may include generating, using the processing device, a second hash value based on the hashing. Further, the methods may include comparing, using the processing device, the first hash value and the second hash value. Further, the methods may include determining, using the processing device, a match between the first hash value and the second hash value based on the comparing. Further, the methods may include generating, using the processing device, a verification result associated with the message sender based on the determining of the match. Further, the verification result may include one of a successful verification result indicating a successful verification of the message sender and an unsuccessful verification result indicating an unsuccessful verification of the message sender. Further, the methods may include obtaining, using the processing device, an augmenting information based on the verification result. Further, the methods may include transmitting, using the communication device, the augmenting with forensics, and the information to at least one vendor device associated with at least one message vendor. Further, the at least one vendor device may be configured for augmenting, using a vendor processing device of the at least one vendor device, a graphic user interface based on the augmenting information. Further, the graphic user interface may include one or more modifiable sections and one or more non modifiable sections. Further, the at least one vendor device may be configured for generating, using the vendor processing device, an augmented graphic user interface based on the augmenting. Further, the augmented graphic user interface may include the one or more modifiable sections with one or more augmenting content. Further, the at least one vendor device may be configured for transmitting, using a vendor communication device of the at least one vendor device, the augmented graphic user interface to at least one receiver device associated with at least one message receiver. Further, at least one receiver device may be configured for presenting the augmented graphic user interface.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
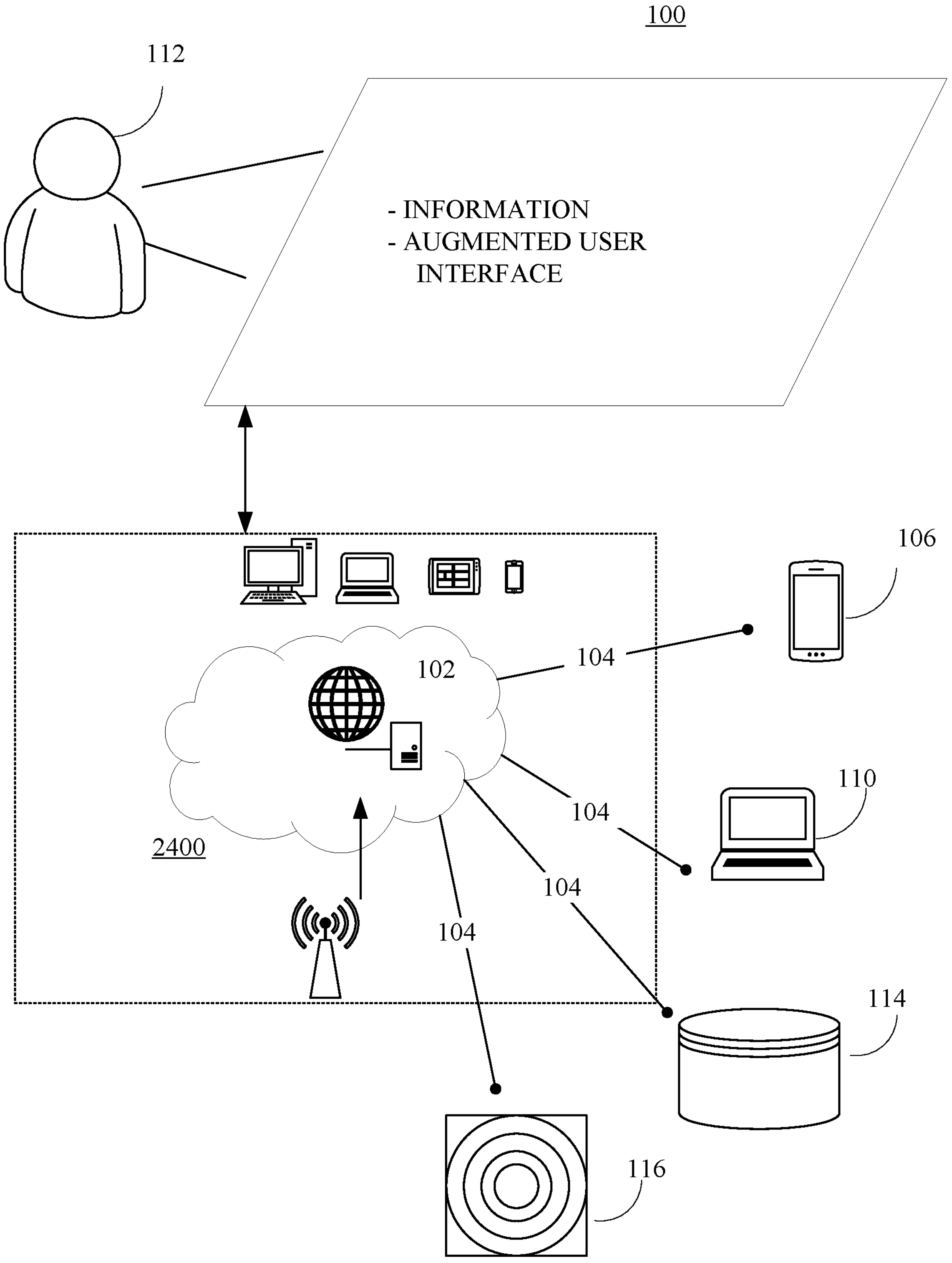
FIG. 1 is an illustration of an online platform consistent with various embodiments of the present disclosure as a 10*k* mile high overview of the high level infrastructure of the Systems where it shows a general group of components involved in the infrastructure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication and identification otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems of facilitating secure messaging, embodiments of the present disclosure are not limited to use only in this context.

In general, the methods disclosed herein may be performed by one or more computing devices. For example, in some embodiments, the methods may be performed by a server computer in communication with one or more client devices over a communication network such as, for example, the Internet. In some other embodiments, the methods may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a supercomputer, a mainframe computer, mini-computer, microcomputer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the methods disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the methods may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the methods may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the methods. The one or more contextual variables may include, for example, but are not limited to, location, time, identity of a user associated with a device (e.g. the server computer, a client device etc.) corresponding to the performance of the one or more steps, physical state and/or physiological state and/or psychological state of the user, and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), etc. associated with the device corresponding to performance of the or more steps).

Further, the one or more steps of the methods may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the methods. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the methods. Accordingly, the one or more predefined conditions may be generated, using the processing device, based on the correlation.

Further, one or more steps of the methods may be performed at one or more spatial locations. For instance, the methods may be performed by a plurality of devices interconnected through a communication network. Accordingly, in an example, one or more steps of the method may be performed by a server computer. Similarly, one or more steps of the methods may be performed by a client computer. Likewise, one or more steps of the methods may be performed by an intermediate entity such as, for example, a proxy server. For instance, one or more steps of the methods may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the methods. For example, in a client-server environment, sensitive data corresponding to a user may not be allowed to be transmitted to the server computer. Accordingly, one or more steps of the methods operating on the sensitive data and/or a derivative thereof may be performed at the client device.

Overview

The present disclosure describes methods and systems of securing SMS message via authenticate the sender's identity and verify the integrity of the SMS message then display the results on to SMS message reader's GUI. Further, the disclosed system may be configured for verifying the true and real identity of an electronic SMS message sender in real time to assure the message receivers that the message was sent by a verified sender.

Further, the disclosed system may be designed to intercept the electronic SMS message and verify the validity of the sender's digital certificate (aka, the public key certificate) as part of a proof of the authenticity of the electronic SMS message's sender. Further, the disclosed system may be configured to provide means for the user to visually confirm the validity of the message's sender. The disclosed system may provide a logo of the sender and a certification logo that replace the gray avatar and the sender's code, respectively, on the screen of the receiver's electronic device (aka, GUI). Further, the disclosed system may provide means for the user to selectively reject any unverified message. The disclosed system may include a reject/drop function that enables the recipient to reject the unverified message. Further, a graphical "stop" sign may be included in the logo area to help the user identify unverified messages.

Further, the disclosed system enables users to easily identify potentially harmful electronic SMS messages by detecting unverified senders of the SMS messages. An unverified sender means that the message sender's digital certificate and/or public key certificate have not been verified or incorrectly reflects the sender's identity claimed. Further, Twocent, an exemplary embodiment of the disclosed system herein may register individual users and organizations so that incoming electronic SMS messages may be relayed to the system.

The present disclosure describes a method that includes the steps of relaying incoming at least one electronic SMS message for at least one recipient to a remote server of the present invention. Once the incoming electronic SMS message has been relayed to the remote server, the message sender's digital certificate and/or public key certificate may be verified. If the validity of the message sender's identity has been proven, the electronic SMS message is forwarded to the recipient along with the corresponding sender's logo and the sender's identity certificate. Then, the electronic SMS message is displayed with several digital security features that assure the recipient of the sender's identity verification results.

The disclosed system logically processes the verification of the identity of the SMS sender and displays the result on a GUI. The GUI shows the 3rd party verification result and the sender's official logo with 3rd part Verifier's attestation texts on the GUI.

Further, the disclosed system may protect both sender and receiver of the SMS from the attacks of forgery, scam, spam, phishing, DDOS, sabotage, espionage, whaling, vishing, impersonation, faking, virus, ransomware, solicitation, MITM (man in the middle attack), cheating, bullying, fraudulent, imitating, tempering, camouflaged malicious financial information, etc.

The disclosed system may enhance the SMS's authenticity, authority, integrity, safety, security, reliability, trustworthiness, traceability, auditability, accountability, non-reputation capability, sign capabilities (alerting, warning, reminding), and responsibility, etc.

Further, the disclosed system may verify the sender's public key certificate and the Integrity of the contents of the SMS by displaying the verification result and corresponding logo icon on the Graphical User Interface (GUI) to help SMS Receiver in security assurance or warning of risks.

Further, the disclosed system may intercept the SMS message and verify the validity of the sender's digital certificate/public key certificate as a part of proof of the authenticity of the sender of the SMS message. Further, the disclosed system may forward the Logo of the sender and Twocent* Certified Text to the receiver to replace the gray Avatar and Sender's Code respectively on the screen of the receiver. Further, the disclosed system may reject/drop the unverified sender message with a big stop sign image in the logo area. The unverified sender means that the sender's digital certificate has not been verified or incorrectly reflects the sender's identity claimed.

Further, in some embodiments, an enrolled organization or individual Initializes sending the SMS message to Twocent. Further, Twocent verifies a sender's Digital/Public Key Certificate first at API Gateway before some lambda ( ) functions on AWS Cloud Infrastructure. Further, if validity has been proved after the validation of the values as proofs of the authenticity of the sender and integrity of the SMS message, Twocent forwards the message with the corresponding organizations or individual's logo and the Integrity certified SMS message to a destination of the message.

Further, the disclosed system may protest senders and receivers from attackers such as forgery, spam, scam, and impersonation. Further, the disclosed system may verify in real time the validity sender's digital certificate and display the sender's logo and verifier's attestation. Further, the disclosed system may provide proof of uniqueness, individuality, and distinctiveness. Further, the disclosed system may assure the message's authenticity and integrity for both the sender and the receiver which increases the trust in the message. Further, the disclosed system may maximumly minimize the attack surfaces on impersonation, phishing, and scamming attacks. Further, the disclosed system may enhance organizational reputation with creativity, practicality, novelty, applicability, and inventive solution via a powerful cloud. Further, the disclosed system may improve user experience and boost business.

FIG. 1 is an illustration of an online platform 100 consistent with various embodiments of the present disclosure. By way of non-limiting example, the online platform 100 to facilitate secure messaging may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2400.

Figure 2:
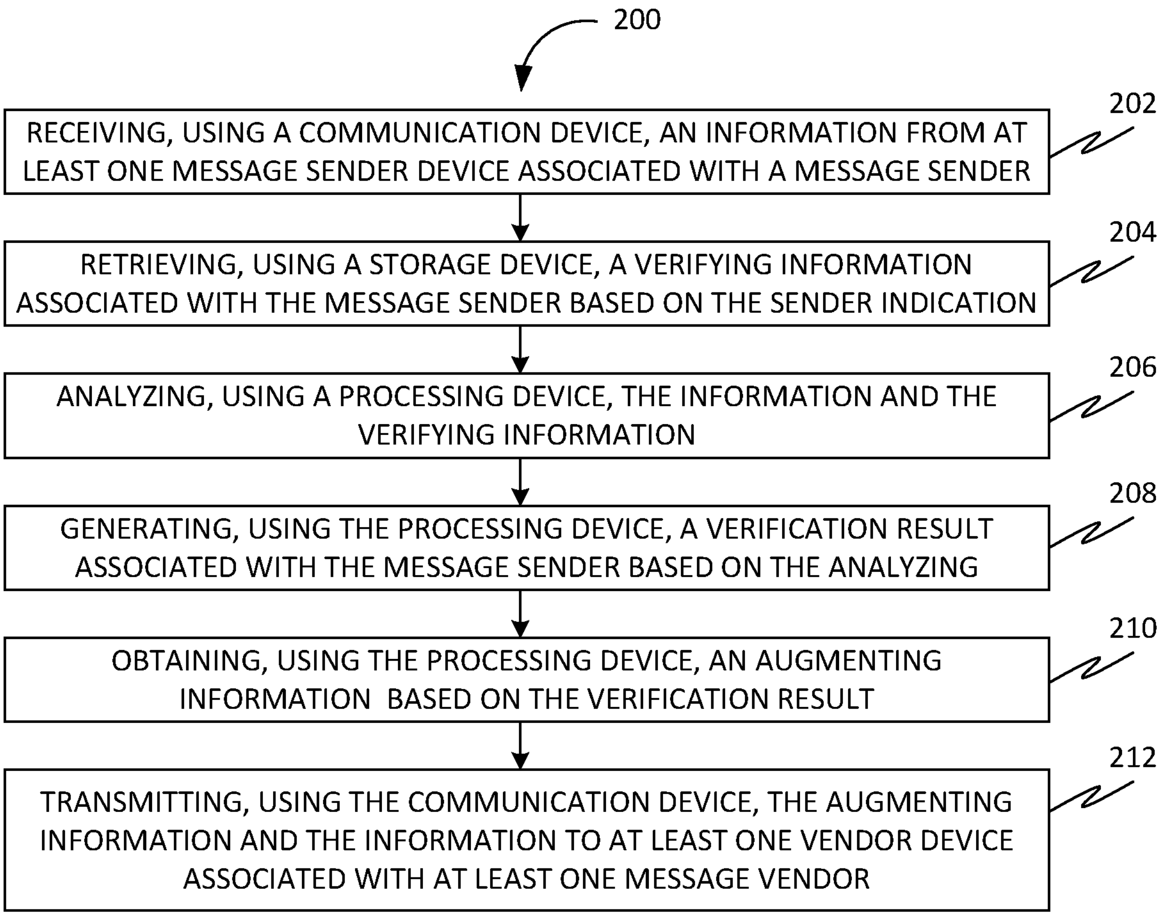
FIG. 2 is a flow chart of a method 200 where it shows a sequence of procedures of facilitating secure SMS messaging via analyzing sender's indication and identification to forward the SMS message, in accordance with some embodiments.

FIG. 2 is a flow chart of a method 200 of facilitating secure messaging, in accordance with some embodiments. Accordingly, at 202, the method 200 may include receiving, using a communication device (such as a communication device 902), an information from at least one sender device (such as at least one sender device 1002) associated with a message sender. Further, the at least one sender device may include a smartphone, a tablet, a laptop, etc. Further, the information may include a sender indication and identification associated with the message sender. Further, at 204, the method 200 may include retrieving, using a storage device (such as a storage device 906), a verifying information associated with the message sender based on the sender indication and identification. Further, at 206, the method 200 may include analyzing, using a processing device (such as a processing device 904), the information and the verifying information. Further, at 208, the method 200 may include generating, using the processing device, a verification result associated with the message sender based on the analyzing. Further, at 210, the method 200 may include obtaining, using the processing device, an augmenting information based on the verification result. Further, at 212, the method 200 may include transmitting, using the communication device, the augmenting information and the information to at least one vendor device (such as at least one vendor device 1004) associated with at least one message vendor. Further, the at least one vendor device may include a server. Further, in an instance, the at least one vendor device may include a smartphone, a tablet, a laptop, etc. Further, the at least one vendor device may be configured for augmenting, using a vendor processing device (such as a vendor processing device 1006) of the at least one vendor device, a graphic user interface (GUI) based on the augmenting information. Further, the at least one vendor device may be configured for generating, using the vendor processing device, an augmented graphic user interface based on the augmenting. Further, the at least one vendor device may be configured for transmitting, using a vendor communication device (such as a vendor communication device 1008) of the at least one vendor device, the augmented graphic user interface to at least one receiver device (such as at least one receiver device 1010) associated with at least one message receiver. Further, the at least one receiver device may be configured for presenting the augmented graphic user interface. Further, the at least one receiver device may include a smartphone, a tablet, a laptop, etc.

Further, in some embodiments, the augmenting information may include a receiver information associated with the at least one receiver. Further, the receiver information may include a receiver name, a contact number, an email address, etc.

Further, in some embodiments, the graphic user interface may include one or more modifiable sections and one or more non modifiable sections. Further, the augmenting the graphic user interface may include augmenting the one or more modifiable sections with one or more augmenting content comprised in the augmenting information. Further, the augmenting of the graphic user interface (GUI) comprising the one or more modifiable sections may include modifying or updating the one or more modifiable portions with the one or more augmenting content. Further, in an instance, the one or more augmenting content may include a logo, a certification badge, a tick symbol, attestation texts, etc. Further, in another instance, the one or more augmenting content may include a warning, an unverified badge, a cross symbol, attestation texts, etc. Further, the augmented GUI may include the graphic user interface with the one or more modifiable portions modified or augmented by superimposing the one or more augmenting content on the GUI.

Further, in some embodiments, the verification result may include a successful verification result indicating a successful verification of the message sender. Further, the one or more augmenting content associated with the successful verification result may include at least one of a verification badge and a logo associated with the message sender. Further, the augmenting of the graphic user interface may be based on at least one of the verification badges and the logo as the indicators of the procedures of a positive verification result.

Further, in some embodiments, the verification result may include an unsuccessful verification result indicating an unsuccessful verification of the message sender. Further, the one or more augmenting content associated with the unsuccessful verification result may include at least one of an unverified badge as a warning symbol with verification result warning statement by the verifier's platform. Further, the augmenting of the graphic user interface may be based on the unverified badge and the warning symbol as the indicators of the procedures of a negative verification result.

Figure 3:
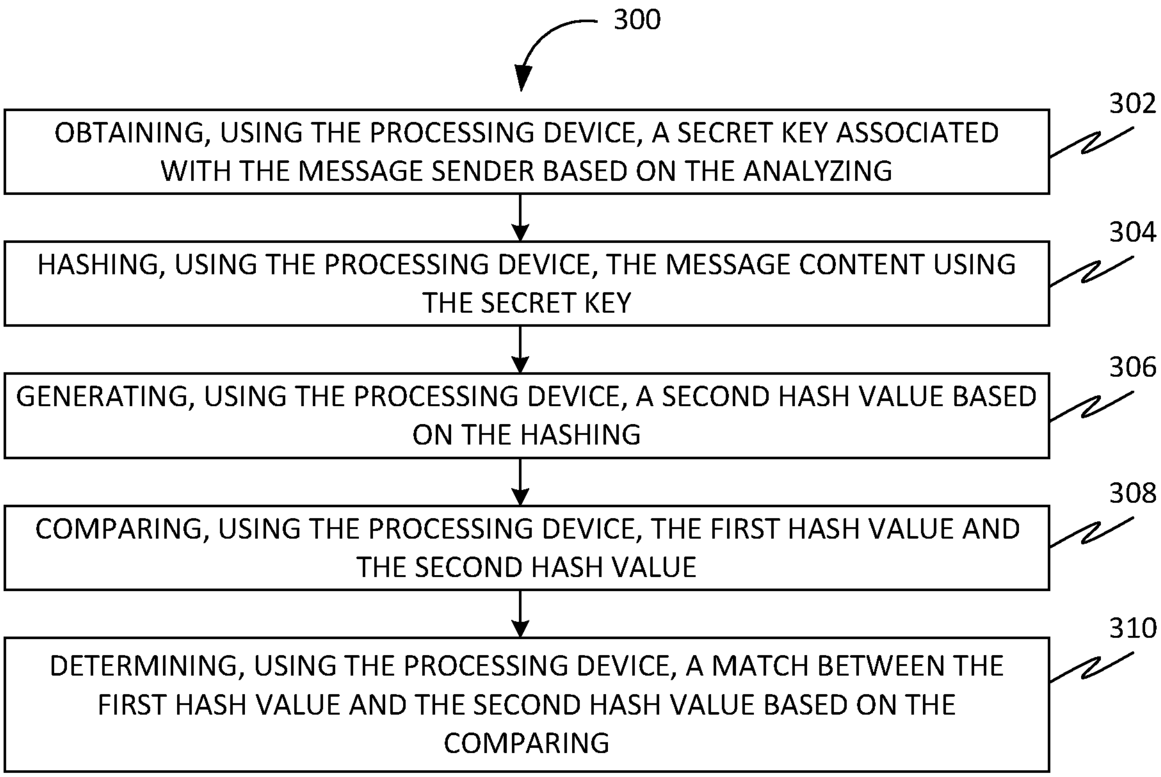
FIG. 3 is a flow chart of a method 300 where it shows a sequence of procedures of facilitating secure SMS messaging via verifying the integrity of the SMS message using the methods of comparing hash values, in accordance with some embodiments.

FIG. 3 is a flow chart of a method 300 of facilitating secure messaging, in accordance with some embodiments. Accordingly, the information may include a message content and a first hash value associated with a message. Further, at 302, the method 300 may include obtaining, using the processing device, a secret key associated with the message sender based on the analyzing. Further, at 304, the method 300 may include hashing, using the processing device, the message content using the secret key. Further, at 306, the method 300 may include generating, using the processing device, a second hash value based on the hashing. Further, at 308, the method 300 may include comparing, using the processing device, the first hash value and the second hash value. Further, at 310, the method 300 may include determining, using the processing device, a match between the first hash value and the second hash value based on the comparing. Further, the generating of the verification result may be based on the determining of the match.

Figure 4:
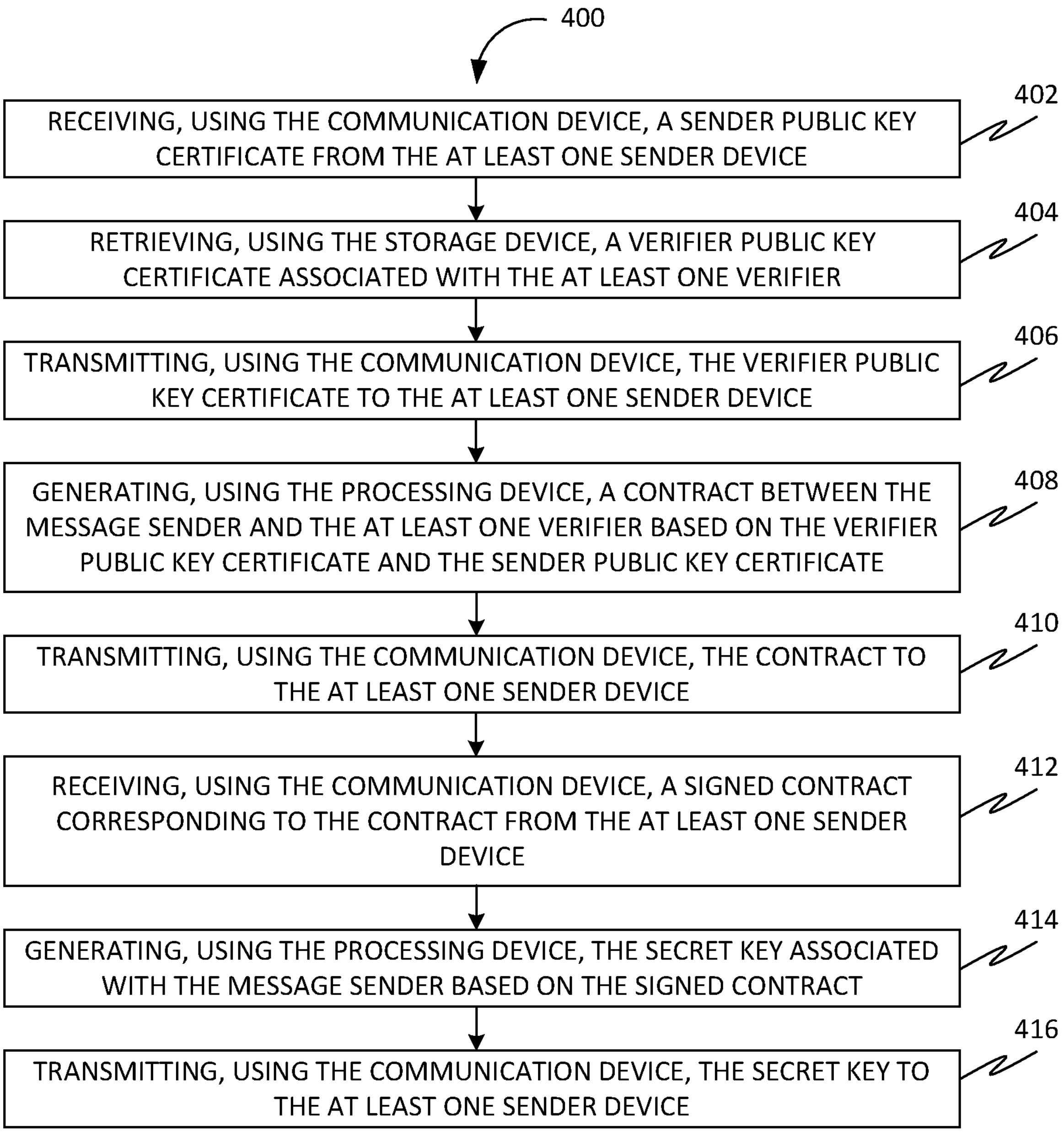
FIG. 4 is a flow chart of a method 400 where it shows the sender's identity in processing for facilitating secure SMS message via authenticating the sender's identity (aka, the digital certificate of sender's or public key certificate), in accordance with some embodiments.

FIG. 4 is a flow chart of a method 400 of facilitating secure messaging, in accordance with some embodiments. Accordingly, at 402, the method 400 may include receiving, using the communication device, a sender public key certificate from the at least one sender device. Accordingly, at 404, the method 400 may include retrieving, using the storage device, a verifier public key certificate associated with the at least one verifier. Further, at 406, the method 400 may include transmitting, using the communication device, the verifier public key certificate to the at least one sender device. Further, at 408, the method 400 may include generating, using the processing device, a contract between the message sender and the at least one verifier based on the verifier public key certificate and the sender public key certificate. Further, at 410, the method 400 may include transmitting, using the communication device, the contract to the at least one sender device. Further, at 412, the method 400 may include receiving, using the communication device, a signed contract corresponding to the contract from the at least one sender device. Further, at 414, the method 400 may include generating, using the processing device, the secret key associated with the message sender based on the signed contract. Further, at 416, the method 400 may include transmitting, using the communication device, the secret key to the at least one sender device.

Figure 5:
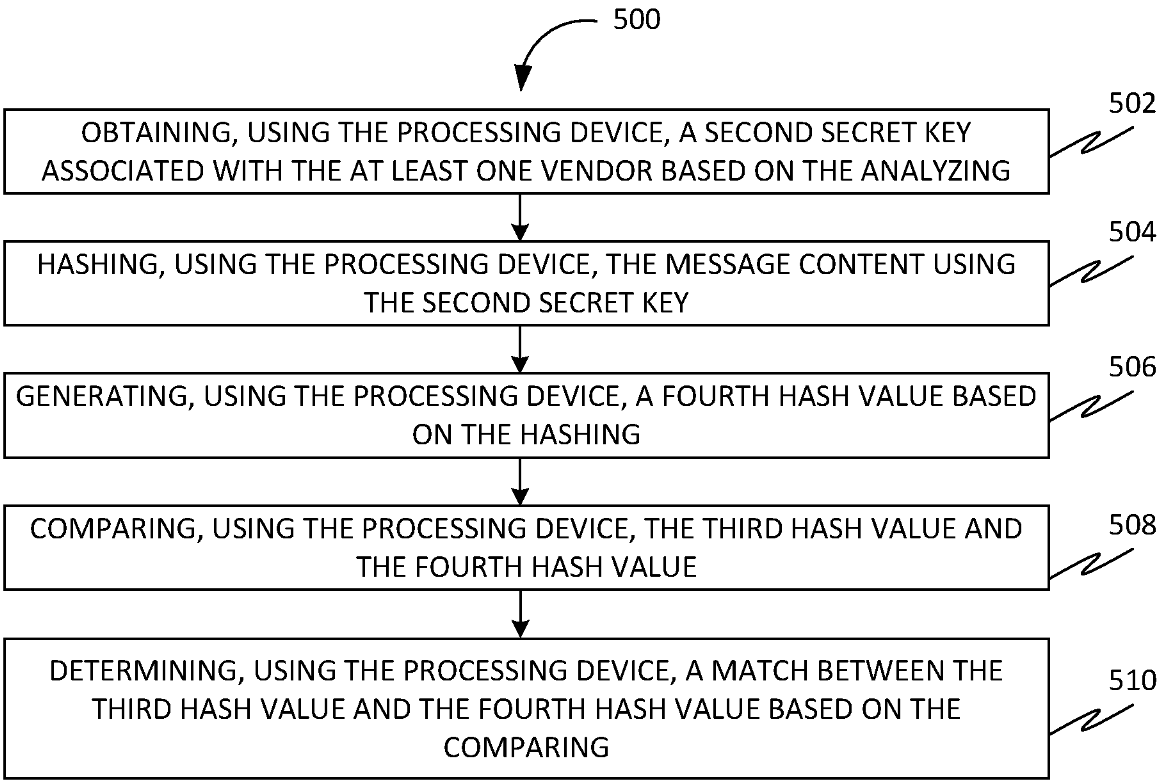
FIG. 5 is a flow chart of a method 500 where it shows the symmetric key is used for facilitating secure SMS message via verifying the hash value in the digital certificate to proof the validity of the digital certification together with using the secret key to rehash, and then, to compare the values, in accordance with some embodiments.

FIG. 5 is a flow chart of a method 500 of facilitating secure messaging, in accordance with some embodiments. Accordingly, the information may include a message content and a third hash value associated with a message. Further, at 502, the method 500 may include obtaining, using the processing device, a second secret key associated with the at least one vendor based on the analyzing. Further, at 504, the method 500 may include hashing, using the processing device, the message content using the second secret key. Further, at 506, the method 500 may include generating, using the processing device, a fourth hash value based on the hashing. Further, at 508, the method 500 may include comparing, using the processing device, the third hash value and the fourth hash value. Further, at 510, the method 500 may include determining, using the processing device, a match between the third hash value and the fourth hash value based on the comparing. Further, the generating of the verification result may be based on the determining of the match.

Figure 6:
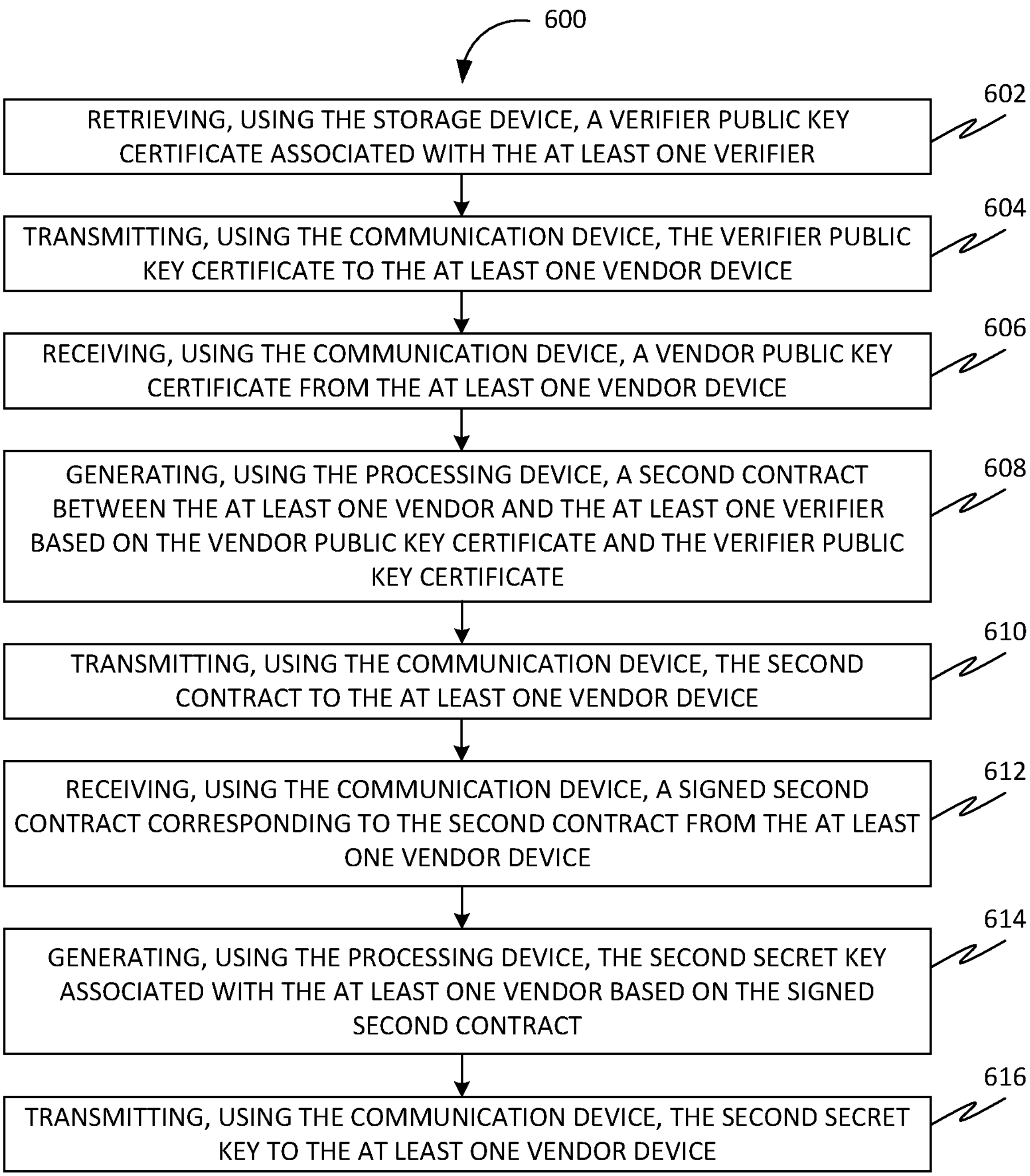
FIG. 6 is a flow chart of a method 600 where it shows the sequence of the operations and procedures of facilitating secure SMS message via verifying the validity of the sender's digital certificate and its integration of the SMS message using secret key to rehash and verification of lifespan, digital signature, common name, revocation status, algorithm, key length, version number and serial number, and version number, etc., in accordance with some more embodiments.

FIG. 6 is a flow chart of a method 600 of facilitating secure messaging, in accordance with some embodiments. Accordingly, at 602, the method 600 may include retrieving, using the storage device, a verifier public key certificate associated with the at least one verifier. Further, at 604, the method 600 may include transmitting, using the communication device, the verifier public key certificate to the at least one vendor device. Further, at 606, the method 600 may include receiving, using the communication device, a vendor public key certificate from the at least one vendor device. Further, at 608, the method 600 may include generating, using the processing device, a second contract between the at least one vendor and the at least one verifier based on the vendor public key certificate and the verifier public key certificate. Further, at 610, the method 600 may include transmitting, using the communication device, the second contract to the at least one vendor device. Further, at 612, the method 600 may include receiving, using the communication device, a signed second contract corresponding to the second contract from the at least one vendor device. Further, at 614, the method 600 may include generating, using the processing device, the second secret key associated with the at least one vendor based on the signed second contract. Further, at 616, the method 600 may include transmitting, using the communication device, the second secret key to the at least one vendor device. The detailed items to be checked in verification on the digital are: its lifespan, digital signature, common name, revocation status, issuer, issue date, algorithm, key length, version number and serial number, and version number, etc.

Figure 7:
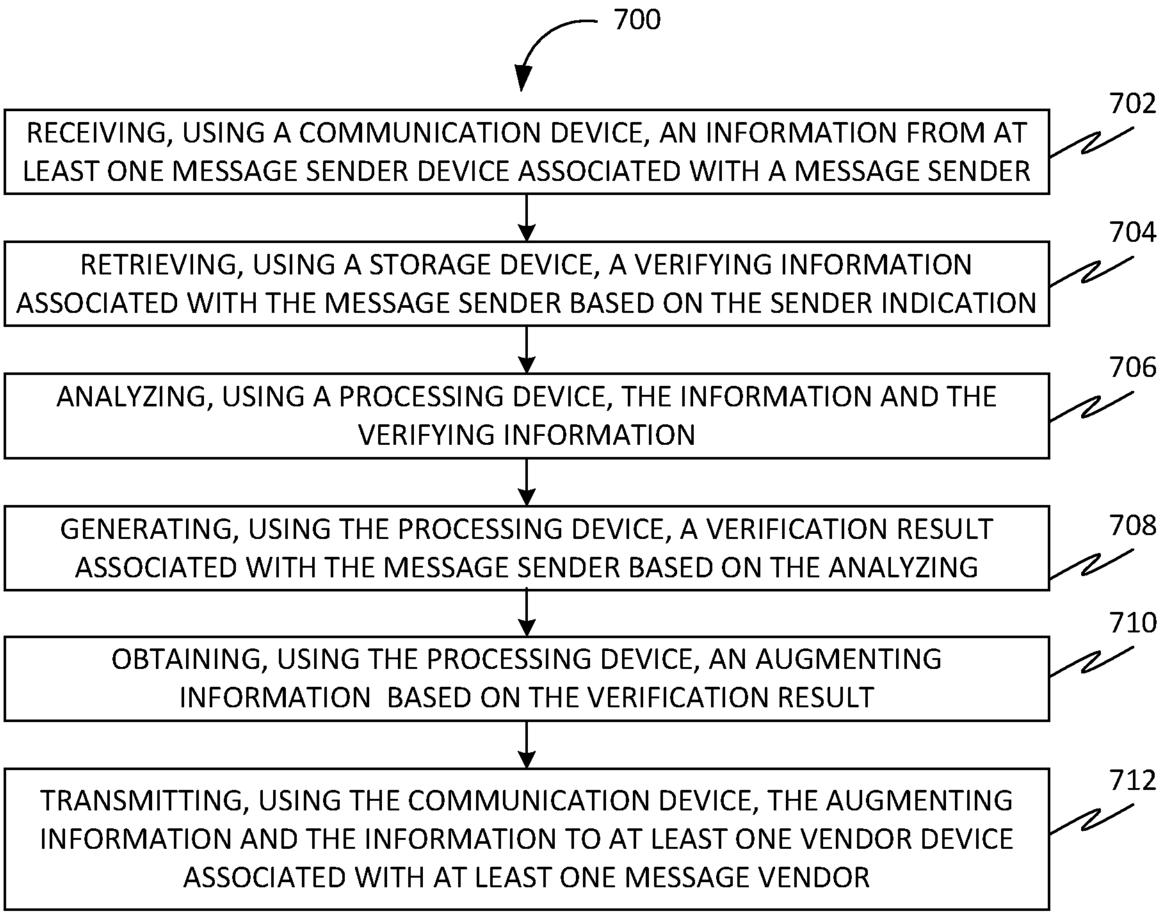
FIG. 7 is a flow chart of a method 700 of facilitating to secure SMS message via verifying the sender's identity and intention, transmitting the SMS message, in accordance with some embodiments.

FIG. 7 is a flow chart of a method 700 of facilitating secure messaging, in accordance with some embodiments. Accordingly, at 702, the method 700 may include receiving, using a communication device, an information from at least one sender device associated with a message sender. Further, the information may include a sender indication and identification associated with the message sender. Further, at 704, the method 700 may include retrieving, using a storage device, a verifying information associated with the message sender based on the sender indication and identification. Further, at 706, the method 700 may include analyzing, using a processing device, the information and the verifying information. Further, at 708, the method 700 may include generating, using the processing device, a verification result associated with the message sender based on the analyzing. Further, at 710, the method 700 may include obtaining, using the processing device, an augmenting information based on the verification result. Further, at 712, the method 700 may include transmitting, using the communication device, the augmenting information and the information to at least one vendor device associated with at least one message vendor. Further, the at least one vendor device may be configured for augmenting, using a vendor processing device of the at least one vendor device, a graphic user interface based on the augmenting information. Further, the graphic user interface may include one or more modifiable sections and one or more non modifiable sections. Further, in the augmenting process, the graphic user interface may include augmenting the one or more modifiable sections with one or more augmenting content comprised in the augmenting information. Further, the vendor device, at least one, may be configured for generating, using the vendor processing device, an augmented graphic user interface based on the augmenting. Further, the vendor device, at least one, may be configured for transmitting, using a vendor communication device of the at least one vendor device, the augmented graphic user interface to at least one receiver device associated with at least one message receiver. Further, the receiver device, at least one, may be configured for presenting the augmented graphic user interface.

Further, in some embodiments, the verification result may include a successful verification result indicating a successful verification of the message sender. Further, the one or more augmenting content associated with the successful verification result may include at least one of a verification badge and a logo associated with the message sender. Further, the augmenting of the graphic user interface may be based on at least one of the verification badge and the logo.

Further, in some embodiments, the verification result may include an unsuccessful verification result indicating an unsuccessful verification of the message sender. Further, the one or more augmenting content associated with the unsuccessful verification result may include at least one of an unverified badge and a warning symbol. Further, the augmenting of the graphic user interface may be based on the unverified badge and the warning symbol.

Figure 8:
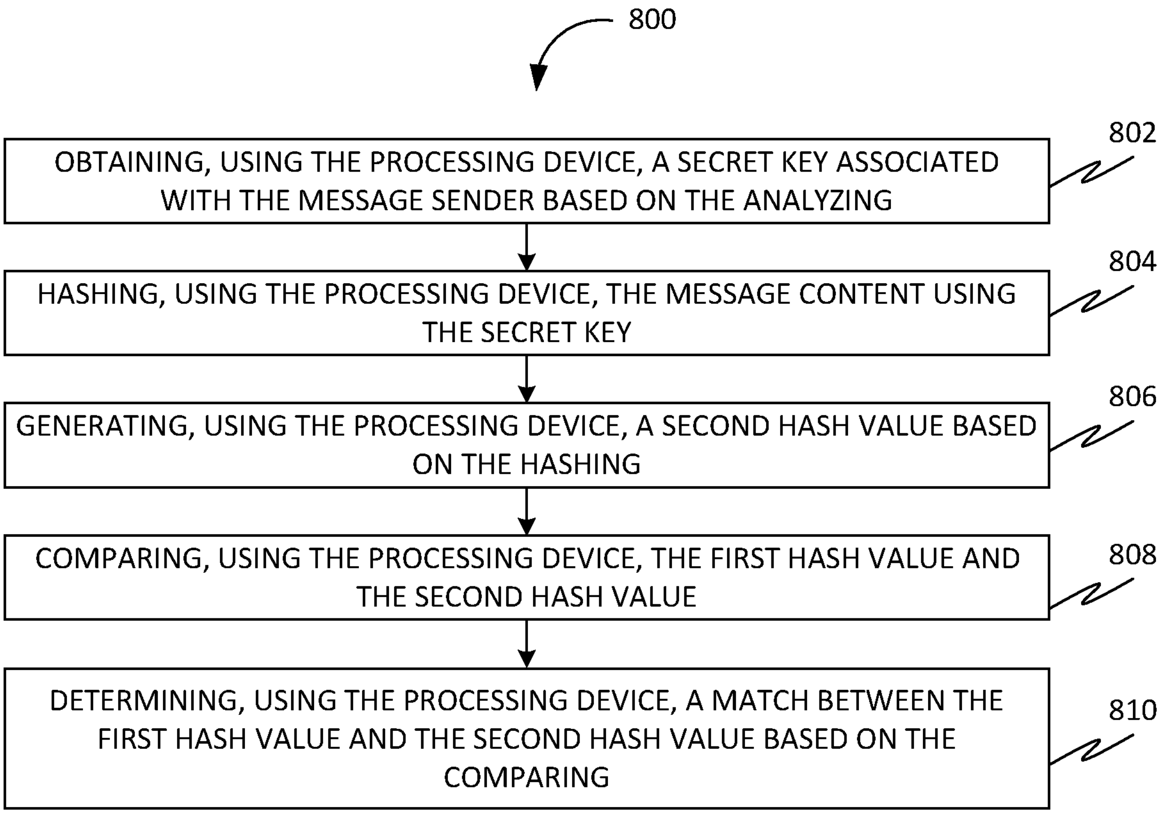
FIG. 8 is a flow chart of a method 800 of facilitating to secure SMS message via using secret symmetric key pare, to hash and rehash for comparing the hashed and rehashed values, in accordance with some embodiments.

FIG. 8 is a flow chart of a method 800 of facilitating secure messaging, in accordance with some embodiments. Accordingly, the information may include a message content and a first hash value associated with a message. Further, at 802, the method 800 may include obtaining, using the processing device, a secret key associated with the message sender based on the analyzing. Further, at 804, the method 800 may include hashing, using the processing device, the message content using the secret key. Further, at 806, the method 800 may include generating, using the processing device, a second hash value based on the hashing. Further, at 808, the method 800 may include comparing, using the processing device, the first hash value and the second hash value. Further, at 810, the method 800 may include determining, using the processing device, a match between the first hash value and the second hash value based on the comparing. Further, the generating of the verification result may be based on the determining of the match.

Figure 9:
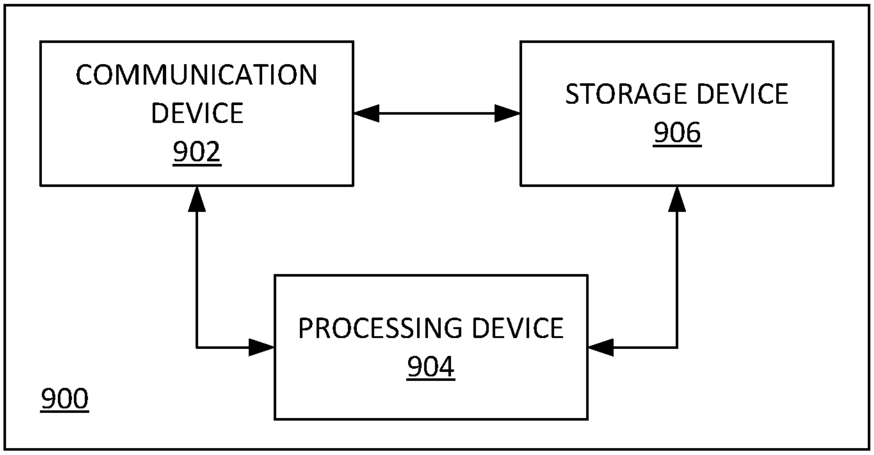
FIG. 9 is a block diagram of a system 900 of a high level architecture design and implementation of the systems that are facilitating to secure SMS messaging systems, in accordance with some embodiments. Further
Figure 10:
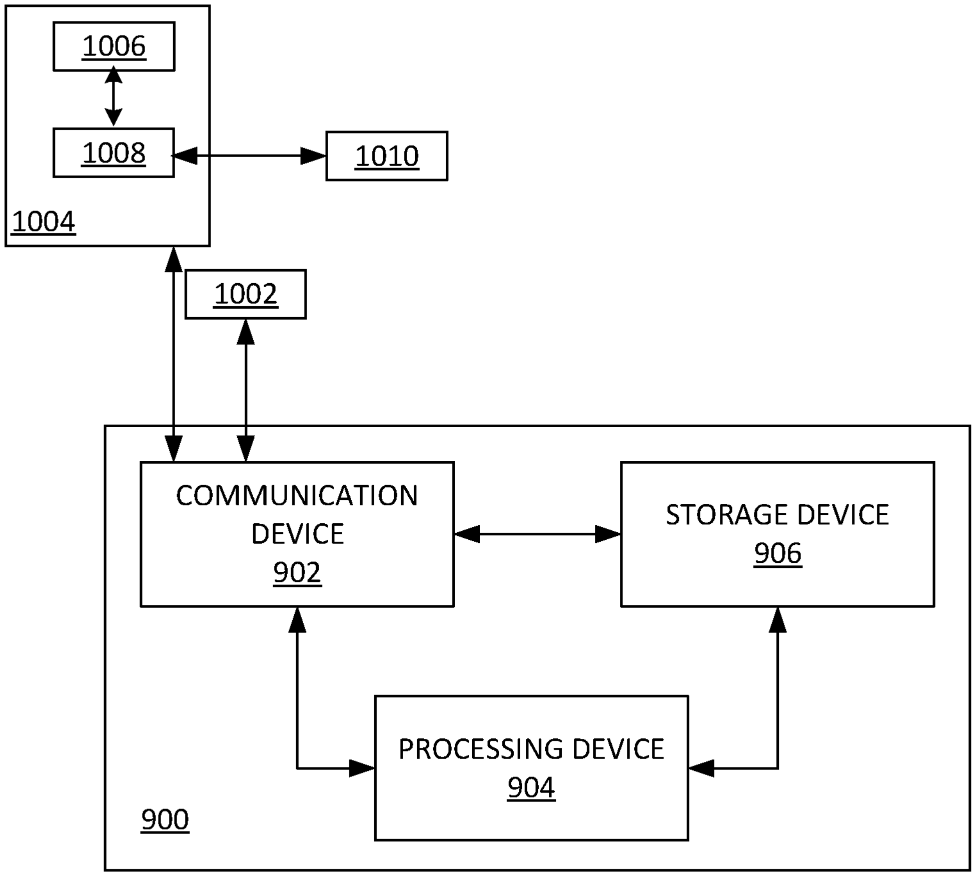
FIG. 10 is a block diagram of the system 900 and 100× of end to end whole and entire high level infrastructure design and implementation for facilitating secure SMS messaging systems, in accordance with some embodiments.

FIG. 9 is a block diagram of a system 900 of facilitating secure messaging, in accordance with some embodiments. Further, the system 900 may include a communication device 902 configured for receiving an information from at least one sender device 1002 (as shown in FIG. 10) associated with a message sender. Further, the information may include a sender's indication and identification associated with the message sender. Further, the communication device 902 may be configured for transmitting an augmenting information and the information to at least one vendor device 1004 (as shown in FIG. 10) associated with at least one message vendor. Further, the at least one vendor device 1004 may include a vendor processing device 1006 (as shown in FIG. 10) configured for augmenting a graphic user interface based on the augmenting information and generating an augmented graphic user interface based on the augmenting. Further, the at least one vendor device 1004 may include a vendor communication device 1008 (as shown in FIG. 10) configured for transmitting the augmented graphic user interface to at least one receiver device 1010 (as shown in FIG. 10) associated with at least one message receiver. Further, the at least one receiver device 1010 may be configured for presenting the augmented graphic user interface;

Further, the system 900 may include a processing device 904 communicatively coupled with the communication device 902. Further, the processing device 904 may be configured for analyzing the information and a verifying information. Further, the processing device 904 may be configured for generating a verification result associated with the message sender based on the analyzing. Further, the processing device 904 may be configured for obtaining the augmenting information based on the verification result.

Further, the system 900 may include a storage device 906 communicatively coupled with the processing device 904. Further, the storage device 906 may be configured for retrieving the verifying information associated with the message sender based on the sender's indication and identification.

Further, in some embodiments, the graphic user interface may include one or more modifiable sections and one or more non modifiable sections. Further, the augmenting the graphic user interface may include augmenting the one or more modifiable sections with one or more augmenting content comprised in the augmenting information.

Further, in some embodiments, the verification result may include a successful verification result indicating a successful verification of the message sender. Further, the one or more augmenting content associated with the successful verification result may include at least one of a verification badge and a logo associated with the message sender. Further, the augmenting of the graphic user interface may be based on at least one of the verification badge and the logo.

Further, in some embodiments, the verification result may include an unsuccessful verification result indicating an unsuccessful verification of the message sender. Further, the one or more augmenting content associated with the unsuccessful verification result may include at least one of an unverified badge and a warning symbol. Further, the augmenting of the graphic user interface may be based on the unverified badge and the warning symbol.

Further, in some embodiments, the information may include a message content and a first hash value associated with a message. Further, the processing device 904 may be configured for obtaining a secret key associated with the message sender based on the analyzing. Further, the processing device 904 may be configured for hashing the message content using the secret key. Further, the processing device 904 may be configured for generating a second hash value based on the hashing. Further, the processing device 904 may be configured for comparing the first hash value and the second hash value. Further, the processing device 904 may be configured for determining a match between the first hash value and the second hash value based on the comparing. Further, the generating of the verification result may be based on the determining of the match.

Further, in some embodiments, the communication device 902 may be configured for receiving a sender public key certificate from the sender device, at least one, 1002. Further, the communication device 902 may be configured for transmitting a verifier public key certificate to the sender device, at least one, 1002. Further, the communication device 902 may be configured for transmitting a contract to the at least one sender device 1002. Further, the communication device 902 may be configured for receiving a signed contract corresponding to the contract from the at least one sender device 1002. Further, the communication device 902 may be configured for transmitting the secret key to the at least one sender device 1002. Further, the processing device 904 may be configured for generating the contract between the message sender and the at least one verifier based on the verifier public key certificate and the sender public key certificate. Further, the processing device 904 may be configured for generating the secret key associated with the message sender based on the signed contract. Further, the storage device 906 may be configured for retrieving the verifier public key certificate associated with the at least one verifier.

Further, in some embodiments, the information may include a message content and a third hash value associated with a message. Further, the processing device 904 may be configured for obtaining a second secret key associated with the at least one vendor based on the analyzing. Further, the processing device 904 may be configured for hashing the message content using the second secret key. Further, the processing device 904 may be configured for generating a fourth hash value based on the hashing. Further, the processing device 904 may be configured for comparing the third hash value and the fourth hash value. Further, the processing device 904 may be configured for determining a match between the third hash value and the fourth hash value based on the comparing. Further, the generating of the verification result may be based on the determining of the match.

Further, in some embodiments, the storage device 906 may be configured for retrieving a verifier public key certificate associated with the at least one verifier. Further, the communication device 902 may be configured for transmitting the verifier public key certificate to the at least one vendor device 1004. Further, the communication device 902 may be configured for receiving a vendor public key certificate from the at least one vendor device 1004. Further, the communication device 902 may be configured for transmitting a second contract to the at least one vendor device 1004. Further, the communication device 902 may be configured for receiving a signed second contract corresponding to the second contract from the at least one vendor device 1004. Further, the communication device 902 may be configured for transmitting the second secret key to the at least one vendor device 1004. Further, the processing device 904 may be configured for generating the second contract between the at least one vendor and the at least one verifier based on the vendor public key certificate and the verifier public key certificate. Further, the processing device 904 may be configured for generating the second secret key associated with the at least one vendor based on the signed second contract.

FIG. 10 is a block diagram of the system 900 of facilitating secure messaging, in accordance with some embodiments.

Figure 11:
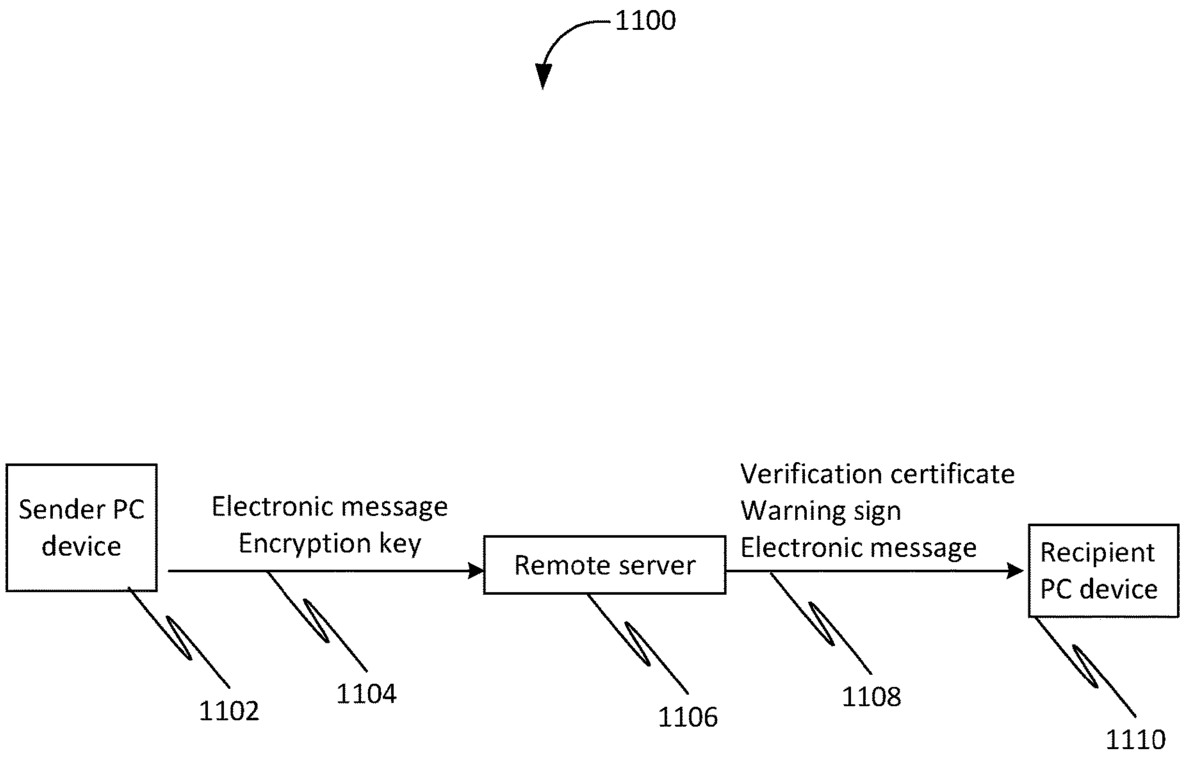
FIG. 11 is a flow diagram of a method 1100 where it shows an end to end sequence of operations and functions to be executed for facilitating secure SMS messages, in accordance with some embodiments.

FIG. 11 is a flow diagram of a method 1100 for facilitating secure messaging, in accordance with some embodiments. Accordingly, at 1104, the method 1100 may include a remote server 1106 receiving an electronic SMS message with an encryption key from a sender device 1102 such as a personal computer. Further, the remote server 1106 may be associated with a key certificate verifier. Further, at 1108, the method 1100 may include the remote server 1106 transmitting the electronic SMS message with one of a verification certificate and a warning sign to a recipient device 1110 such as a personal computer.

Figure 12:
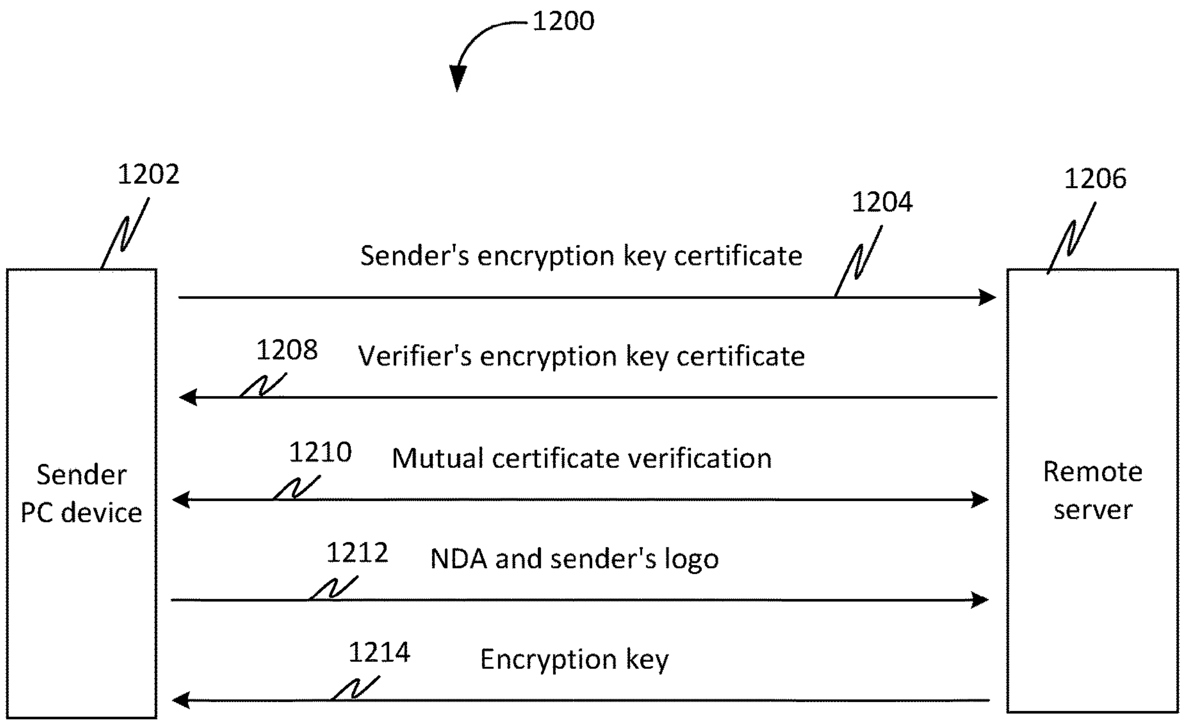
FIG. 12 is a flow diagram of a method 1200 where it shows the initial engagement processes between sender and remote server (the intended platform) via mutually authentication and then NDA to be signed digitally for facilitating registration subprocess of a message sender, in accordance with some embodiments.

FIG. 12 is a flow diagram of a method 1200 for facilitating registration subprocess of a message sender, in accordance with some embodiments. Accordingly, at 1204, the method 1200 may include a sender device 1202 transmitting a sender encryption certificate to a remote server 1206 associated with a key certificate verifier. Further, at 1208, the method 1200 may include the remote server 1206 transmitting a verifier's encryption key certificate to the sender device 1202. Further, at 1210, the method 1200 may include mutual certificate verification. Further, at 1212, the method 1200 may include the sender device 1202 transmitting an NDA and a sender's logo to the remote server 1206. Further, at 1214, the method 1200 may include the remote server 1206 transmitting an encryption key to the sender device 1202.

Figure 13:
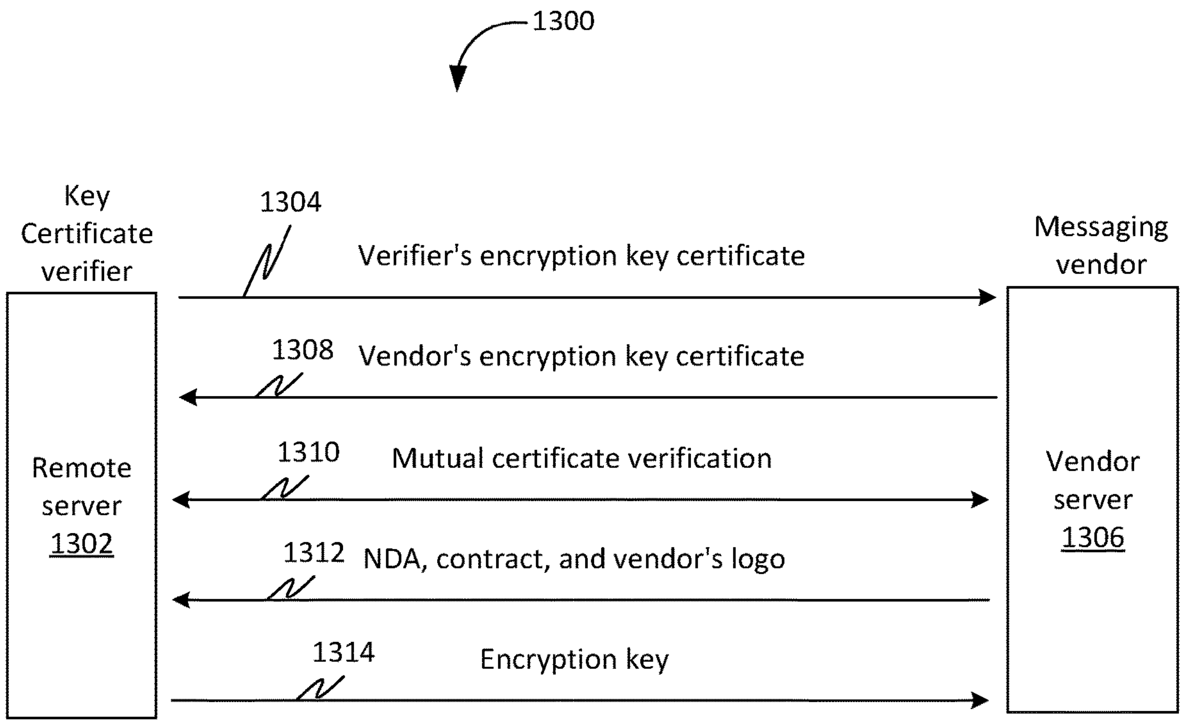
FIG. 13 is a flow diagram of a method 1300 where it shows the initial engagement processes between remote server (the intended platform) via a mutually authentication and then NDA to be signed digitally for facilitating registration subprocess with messaging vendors (receiver's platform for readers), in accordance with some embodiments.

FIG. 13 is a flow diagram of a method 1300 for facilitating registration subprocess with messaging vendors, in accordance with some embodiments. Accordingly, at 1304, the method 1300 may include a remote server 1302 associated with a key certificate verifier transmitting a verifier's encryption key certificate to a vendor server 1306 associated with a messaging vendor (such as WhatsApp™, WeChat™, Snapshot™, Facebook™, Linkedin™ Twitter™, etc. Further, at 1308, the method 1300 may include the vendor server 1306 transmitting a vendor's encryption key certificate to the remote server 1302. Further, at 1310, the method 1300 may include mutual certificate verification. Further, at 1312, the method 1300 may include the vendor device 1306 transmitting an NDA, a contract, and a vendor's logo to the remote server 1302. Further, at 1314, the method 1300 may include the remote server 1302 transmitting an encryption key to the vendor device 1306.

Figure 14:
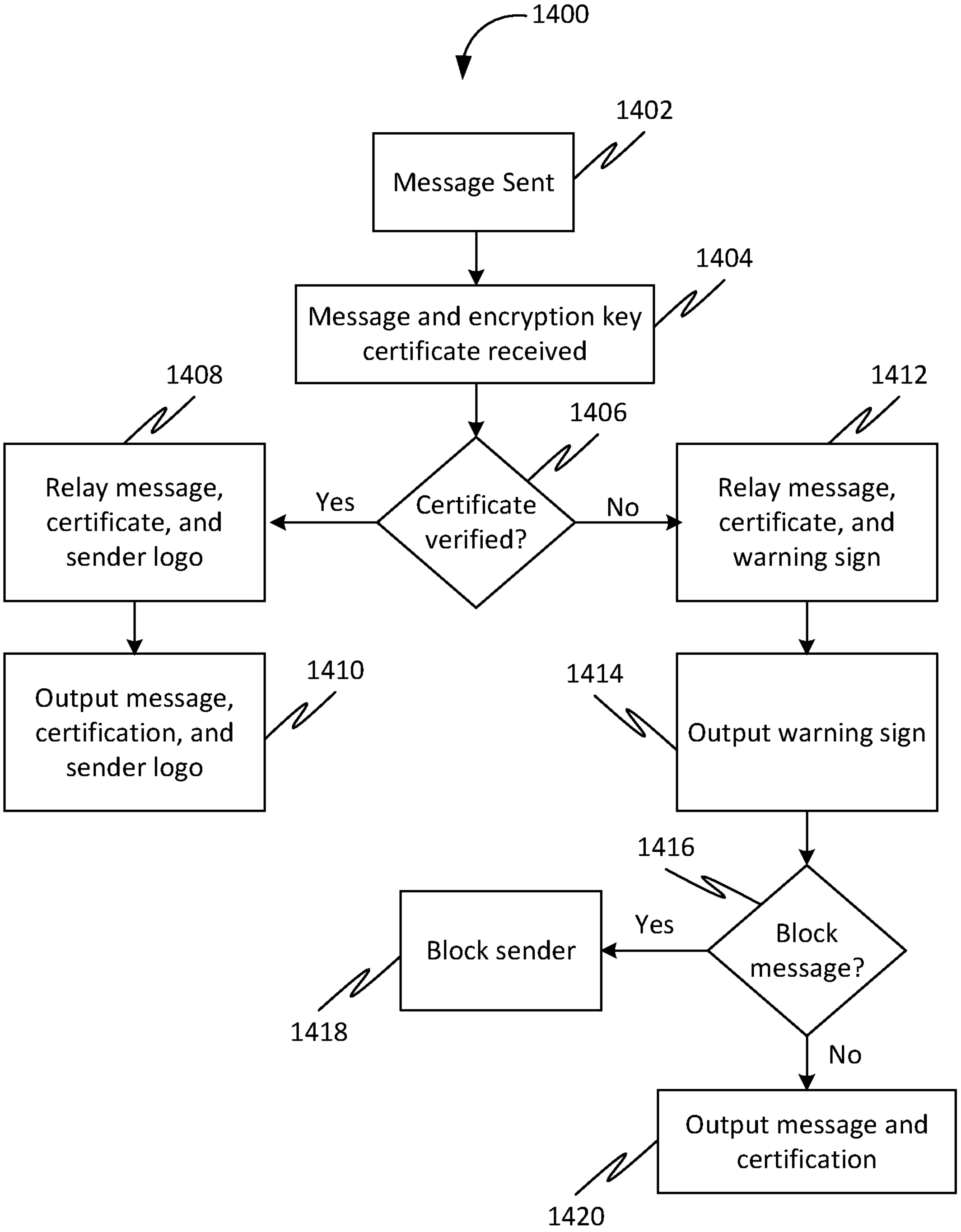
FIG. 14 is a flowchart diagram of a method 1400 where it shows the major functional logical decision-making processes and its logical flows for facilitating verification subprocess together with the results output and display the result message to the reader's GUI next, in accordance with some embodiments.

FIG. 14 is a flow diagram of a method 1400 for facilitating a verification subprocess, in accordance with some embodiments. Accordingly, at 1402, the method 1400 may include sending a message. Further, at 1404, the method 1400 may include receiving a message and an encryption key. Further, at 1406, the method 1400 may include checking if a certificate is verified. Further, if the certificate is not verified, at 1412, the method 1400 may include relaying the message, the certificate, and a warning sign. Further, at 1414, the method 1400 may include outputting a warning sign. Further, at 1416, the method 1400 may include checking if the message is to be blocked. Further, if the message is blocked, at 1418, the method 1400 may include blocking a sender associated with the message. Further, if the message is not blocked, at 1420, the method 1400 may include outputting the message and a certification.

Further, if the certificate is verified at 1406, the method 1400, at 1408, may include relaying the message, the certificate, and a sender logo. Further, at 1410, the method 1400 may include outputting the message, the certification, and the sender logo.

Figure 15:
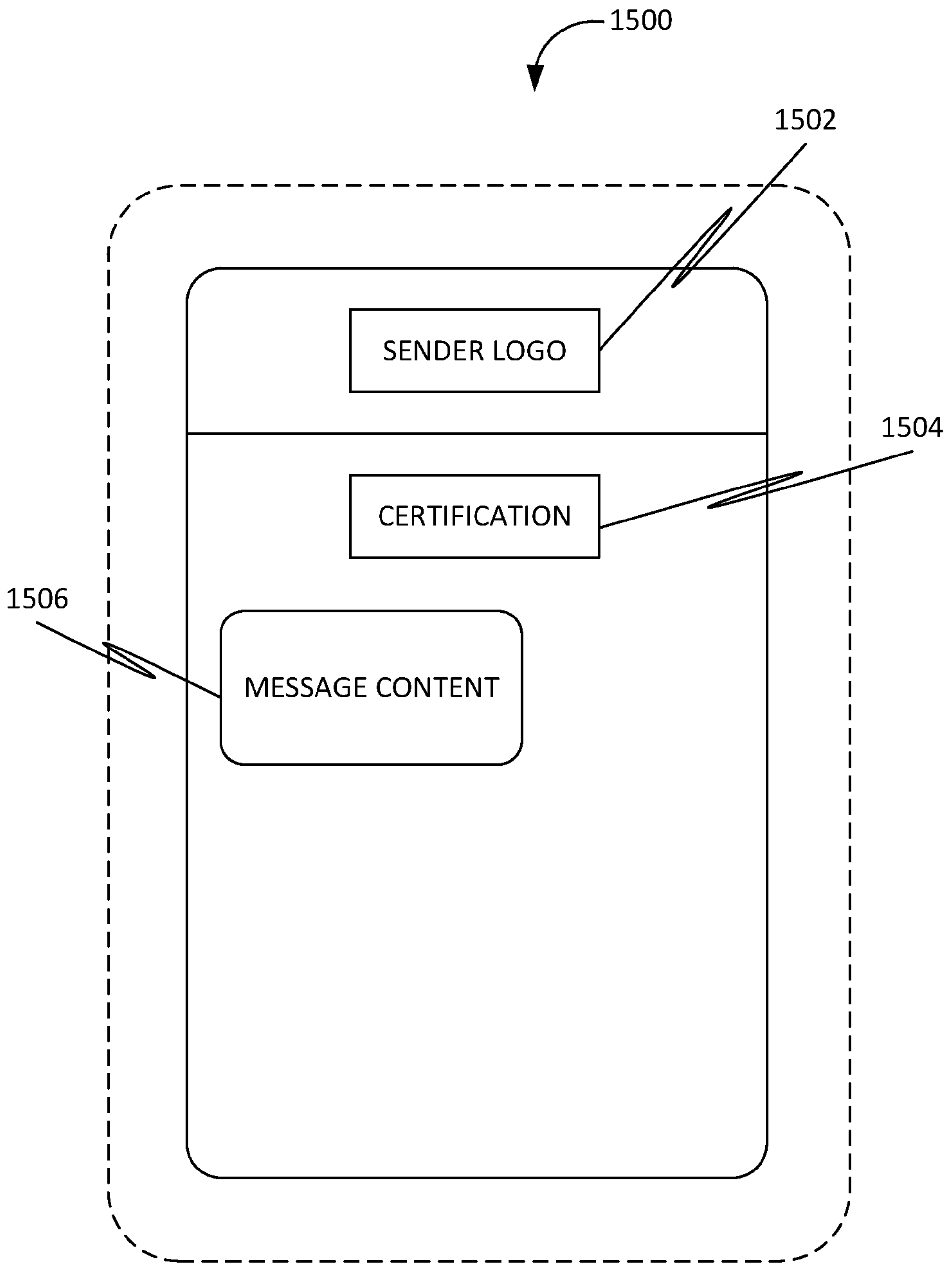
FIG. 15 is a screenshot of a user interface 1500 showing a message screen of a recipient's PC (Wired and/or Wireless Computing device) device where it shows the verified sender's logo and its certification verifier's statement as a positive and legitimate certification, in accordance with some embodiments.

FIG. 15 is a screenshot of a user interface 1500 showing a message screen of a recipient's PC device, in accordance with some embodiments. Accordingly, the user interface 1500 may be associated with a sender whose identity has been verified. Further, the user interface 1500 may include a sender logo 1502, a certification 1504, and a message content 1506.

Figure 16:
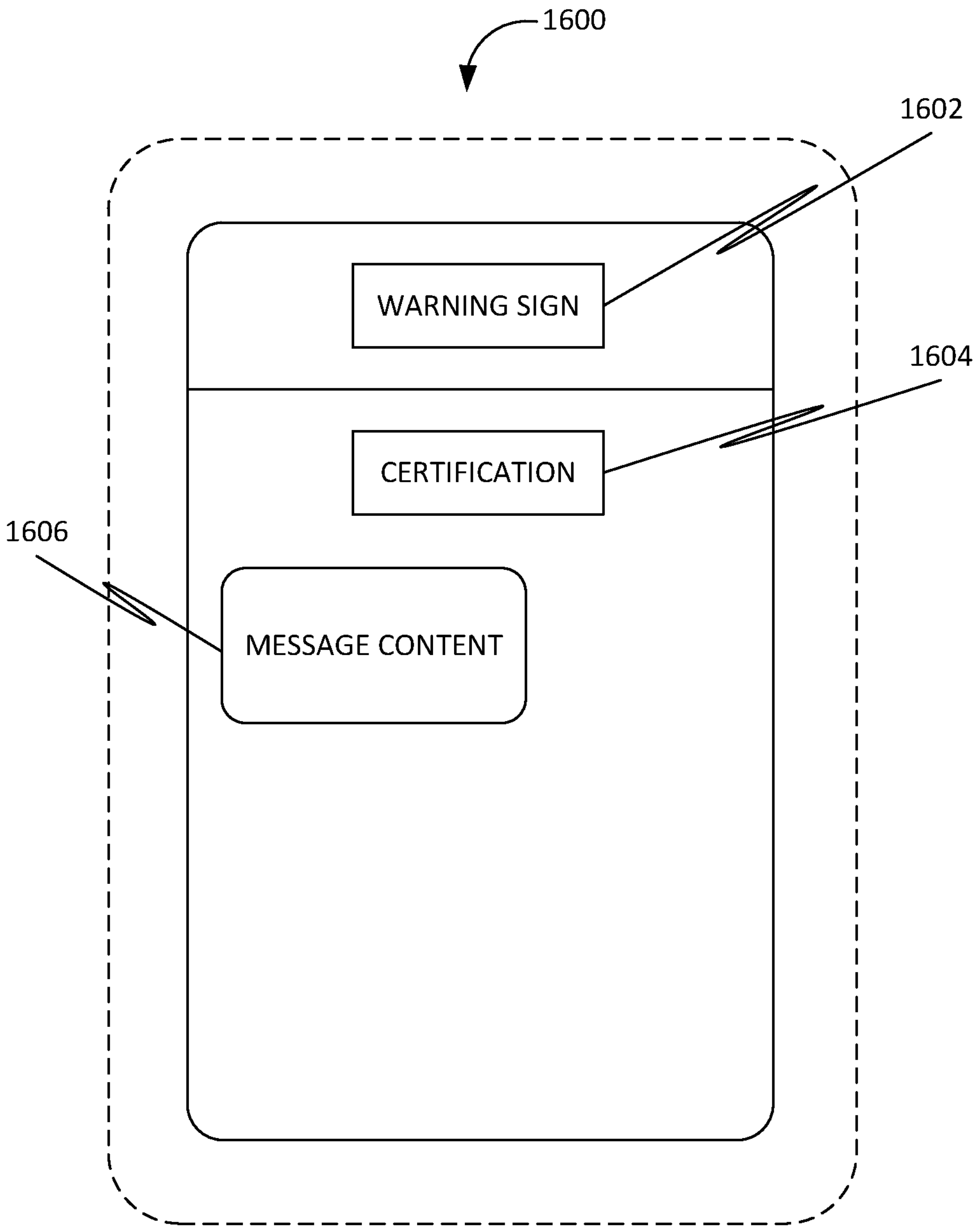
FIG. 16 is a screenshot of a user interface 1600 showing a message screen of a recipient's PC device. Where there is a GUI that if the sender's identity is not authenticated, it displays a traffic red stop sign for warning and the warning statement from certification verifier (remote server) as a negative certification, in accordance with some embodiments.

FIG. 16 is a screenshot of a user interface 1600 showing a message screen of a recipient's PC device, in accordance with some embodiments. Accordingly, the user interface 1600 may be associated with a sender whose identity has not been verified. Further, the user interface 1600 may include a warning 1602, a certification 1604, and a message content 1606.

Figure 17:
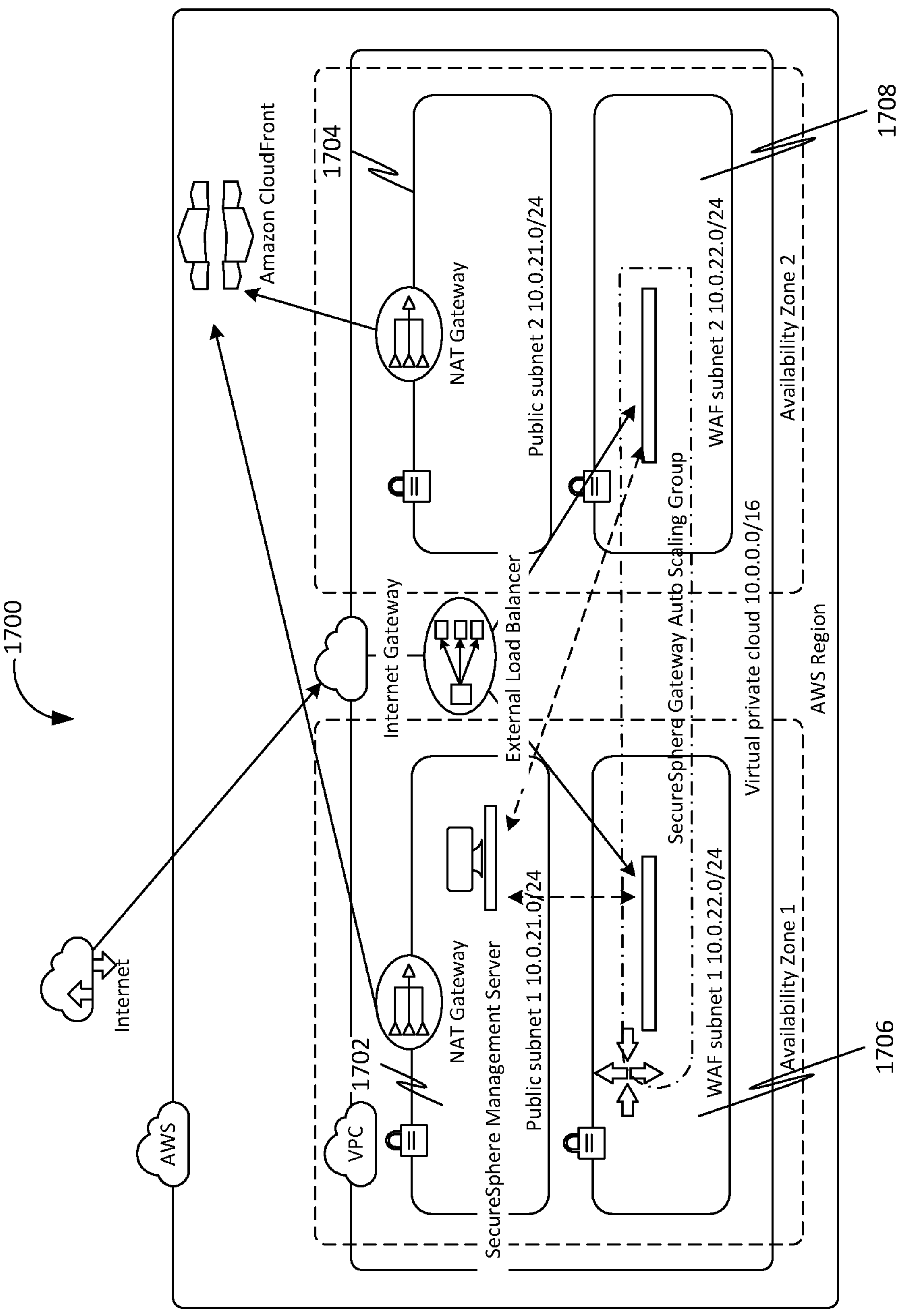
FIG. 17 is a schematic of a system infrastructure associated with a system 1700 where there is a high level infrastructure design and implementation diagram that enables, hosts, executes, and conducts the functions for facilitating secure SMS messaging, in accordance with some AWS Cloud embodiments.

FIG. 17 is a schematic of a system infrastructure associated with a system 1700 for facilitating secure messaging, in accordance with some embodiments. Accordingly, the system 1700 may be associated with a first NAT gateway 1702, a second NAT gateway 1704, a first WAF subnet 1706, and a second WAF subnet 1708.

Figure 18:
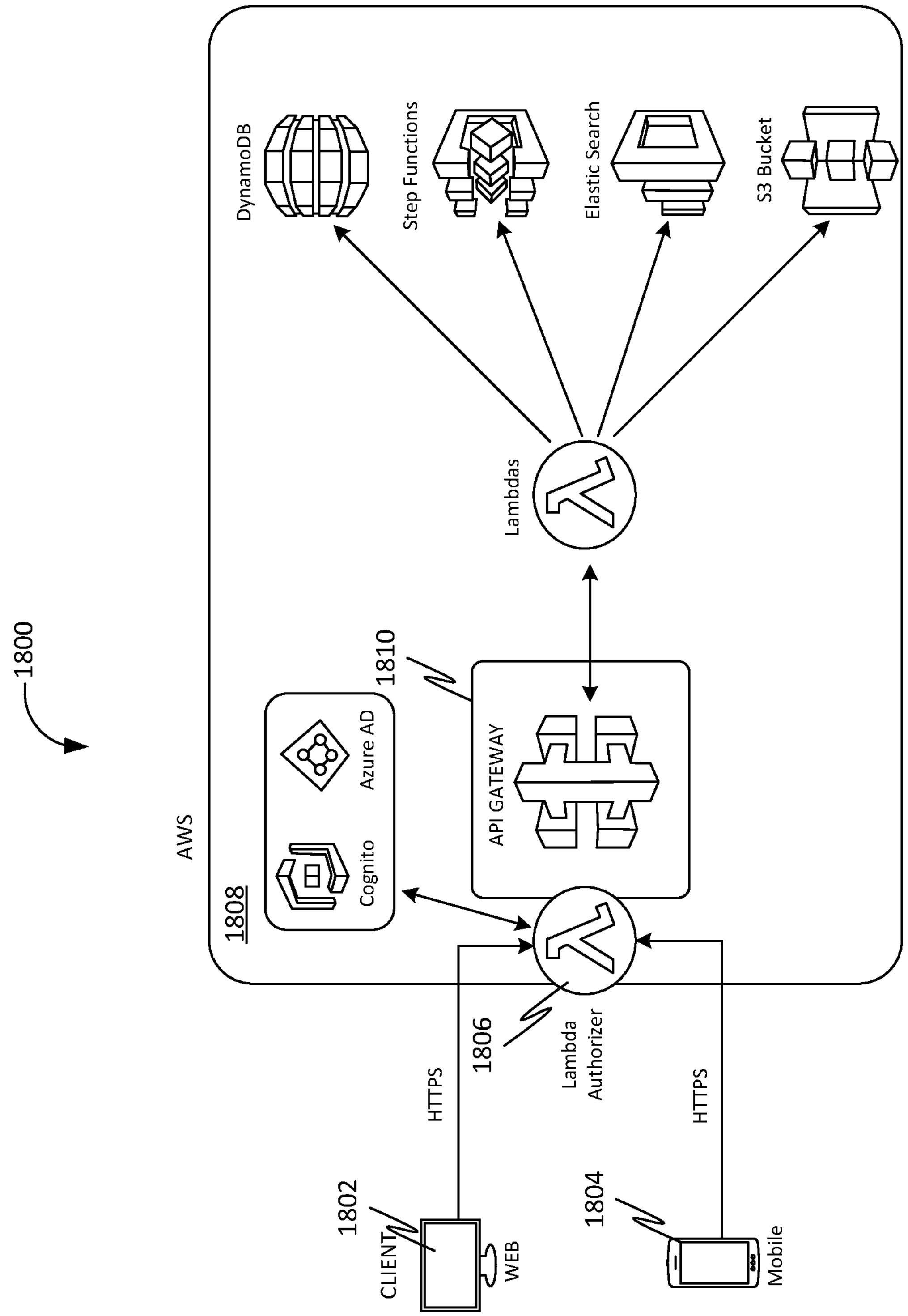
FIG. 18 is a schematic of a system infrastructure associated with a system 1800 where there is an end to end illustration on client/sender, remote server, and the reader/receiver telecommunication's design and implementation diagram that enables, hosts, executes, and conducts the functions for facilitating secure messaging, in accordance with some embodiments.

FIG. 18 is a schematic of a system infrastructure associated with a system 1800 for facilitating secure messaging, in accordance with some embodiments. Accordingly, the system 1800 may include one or more client devices 1802-1804 communicatively coupled with a lambda authorizer 1806. Further, the system 1800 may include AWS 1808. Further, at 1810, the lambda authorizer 1806 may use an API gateway.

Figure 19:
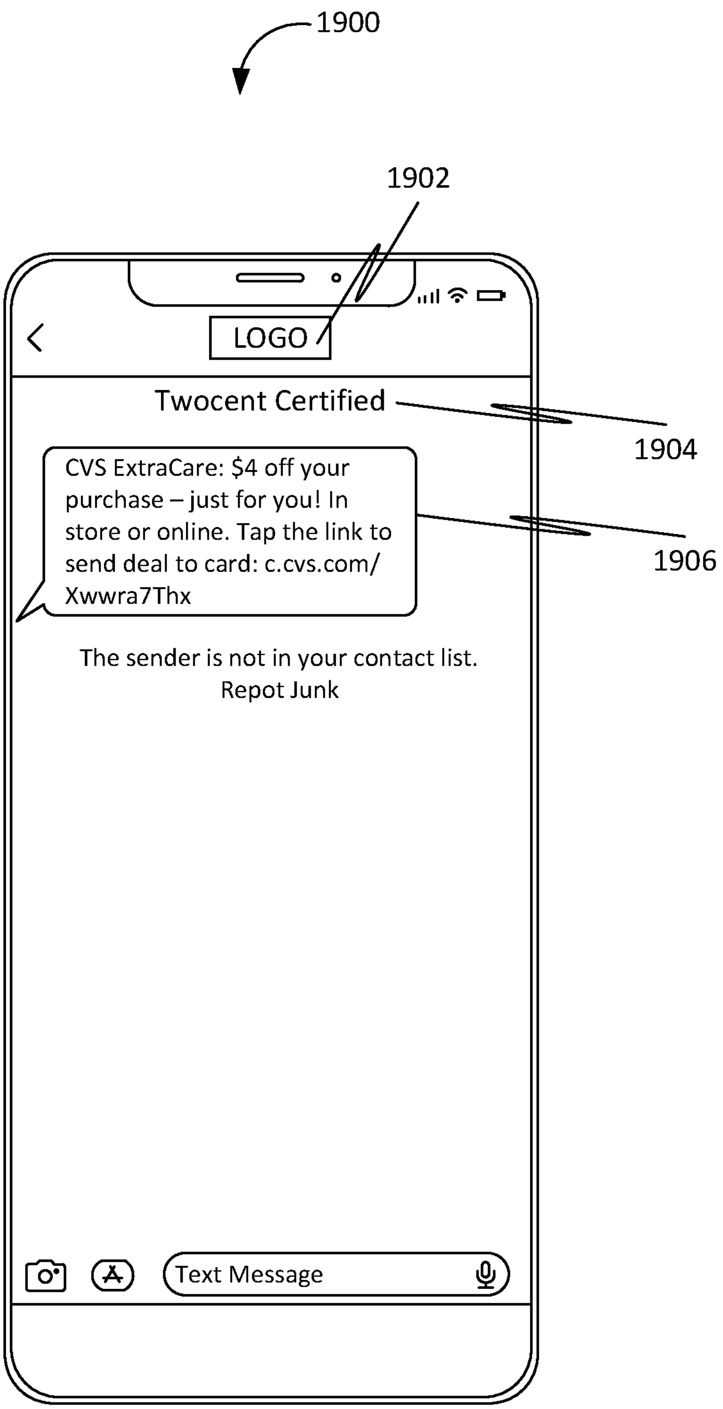
FIG. 19 is a screenshot of a user interface 1900 where there is sample content of the verification results displaying on to the SMS message reader's GUI and it is showing a message screen of a recipient's PC device, in accordance with some embodiments.

FIG. 19 is a screenshot of a user interface 1900 showing a message screen of a recipient's PC device, in accordance with some embodiments. Accordingly, the user interface 1900 may be associated with a sender whose identity has been verified. Further, the user interface 1900 may include a sender logo 1902, a certification 1904, and a message content 1906.

As can be seen in FIGS. 11-16 and FIG. 19, the present invention protects message senders and receivers from bad actors that try to abuse the messaging technology to perform various illegal activities including, but not limited to, forgery, spam, scam, and impersonation. The disclosed system enables real-time verification of the sender's digital identity to provide the recipient assurance that the message's authenticity and integrity have been thoroughly verified. This way, the recipient and the sender can have trust in the use of electronic SMS messages. The disclosed system further enhances organizational reputation with creativity, practicality, novelty, and applicability via powerful cloud services. As a result, the user experience is improved, and business is boosted.

In the preferred embodiment, the disclosed system enables the verification of the sender's identity. As can be seen in FIGS. 11-14 and FIG. 19, the system may include a remote server that verifies the sender's identity. The remote server can be provided as an external service that users or messaging vendors can request access to. For example, the disclosed system can be provided as a third-party service that individual users and/or organizations can sign up with to verify the electronic SMS messages being transmitted using the organization's services. Alternatively, the disclosed system can be integrated into the infrastructure of the communications provider. For example, the disclosed system can be included as part of the services offered by the organization's services. In addition, the system may include at least one external server that preferably corresponds to the one or more servers from the communications provider. The external server further manages at least one sender account and at least one recipient account. The at least one sender account preferably corresponds to the account of the user sending at least one electronic SMS message to at least one recipient. The at least one recipient account corresponds to the user that is the recipient of at least one electronic SMS message.

Both the sender account and the recipient account are also associated with a corresponding sender Personal Computing (PC) device and a corresponding recipient PC device, respectively. Both the sender PC device and the recipient PC device can be any computing device with communication capabilities including, but not limited to, smartphones. In addition, the sender account includes a digital certificate and/or a public key certificate that can be used to verify the identity of the sender. Further, electronic SMS messages can include different types of electronic SMS messages sent over different communication protocols including, but not limited to, text messages, direct messages, voice messages, etc. Furthermore, the electronic SMS message can be several electronic SMS messages sent by one or more sender accounts. Likewise, the electronic SMS message can be sent to several recipient accounts and could be sent through different communication services.

As can be seen in FIGS. 11-16 and FIG. 19, the system is designed to enable the quick identity verification of the electronic SMS message's sender without hindering the transmission of the electronic SMS message from the sender to the recipient. Along with the system, the disclosed method ensures that the identity verification of the message's sender is performed in real-time without greatly delaying the transmission of the electronic SMS message to the recipient. The overall method includes the steps of prompting the sender account to input an electronic SMS message using the corresponding sender's PC device. Once the electronic SMS message is entered by the sender account, the electronic SMS message is relayed from the corresponding sender PC device, through the external server, and to the remote server. Then, the digital certificate corresponding to the sender account is verified with the remote server. Once the verification process of the sender's digital certificate is completed, a verification certificate is generated using the remote server. Then, the electronic SMS message is relayed from the remote server, through the external server, and to the corresponding recipient PC device. Finally, the electronic SMS message is displayed with a display screen of the corresponding recipient's PC device along with the verification certificate.

As can be seen in FIGS. 17 and 18, in the preferred embodiment, the remote server of the present invention can utilize third-party cloud computing services to perform the identification verification process including, but not limited to, Amazon Web Services. In this embodiment, the electronic SMS message as well as the sender's digital certificate are wirelessly relayed to the cloud computing service via the Internet. An external load balancer distributes the data received corresponding to the electronic SMS message and the sender's digital certificate which is processed by a server monitoring service such as the SecureSphere Management Server for different processes including, but not limited to, auto-scaling purposes. Further, the different processes can be performed within a Virtual Private Cloud (VPC) and divided into separate subnets. Further, the data received can be processed through one or more Web Application Firewalls (WAFs). Once the data received is processed, the data can then be relayed to a Content Distribution Network (CDN) such as Amazon CloudFront which enables the contents of the electronic SMS message as well as the verification certificate to be delivered to the recipient account. In other embodiment, different cloud services can be utilized.

Furthermore, to enable the secure transmission of the electronic SMS message and the corresponding sender's digital certificate, the present invention can utilize an Application Programming Interface (API) lambda authorizer that enables the use of custom authorization schemes. The lambda authorizer controls the access to the API gateway from which various lambda functions can be performed. The lambda functions can interact with various database services including, but not limited to, NoSQL database services such as AWS DynamoDB, visual workflow services such as AWS Step Functions, distributed search analytics engines such as Elasticsearch, and object storage services such as AWS S3 Bucket. In order to verify the sender's identity using the sender's digital certificate, several values of the digital certificate can be evaluated. The values evaluated can include but are not limited to, the subject alternative name, enhanced key usage, subject key identifier, certificate policies, authority information access, authority key identifier, CRL distribution points SCT list, etc. Further, various details can be verified including, but not limited to, certificate issuance information such as the organization issued to and/or the organization issuing the certificate, the validity period, digital fingerprints, etc.

As can be seen in FIGS. 11-16 and FIG. 19, the disclosed system may utilize different means to verify the sender's digital certificate. In the preferred embodiment, the sender may register to create a sender account with the present invention. When the sender is registered, the sender's public key certificate and the system's public key certificate are mutually verified by both parties. Further, a Non-Disclosure Agreement (NDA) can be signed to protect the sender's information, and the sender's logo can be shared and stored by the system. In addition, an encryption key is generated by the system and relayed to the sender for future use so that the verification process can be automatically processed in real-time. In a similar process, the system can manually register sender accounts with different messaging vendors separately. The messaging vendors can include but are not limited to, native messaging applications, social media applications, etc. Thus, when the electronic SMS message is relayed from the corresponding sender PC device to the remote server, the encryption key hashed value is also relayed to the remote server. The remote server then uses the electronic SMS message and the encryption key to regenerate the shared encryption key to rehash the electronic SMS message and then compare the two hash values. If the two values are the same, then the electronic SMS message is determined to be authentic and original with completeness and integrity. This way, the verification process can be done dynamically in real-time to not affect the transmission of the electronic SMS message from the sender to the recipient. In other embodiments, different verification methods can be utilized.

As previously discussed, once the verification process is performed, the verification certificate is generated and relayed along with the electronic SMS message to the corresponding recipient's PC device. As can be seen in FIGS. 11-19, in the preferred embodiment, once the electronic SMS message and the verification certificate are received, the electronic SMS message is displayed using the corresponding communications service. In addition, according to the results provided in the verification certificate, the logo of the sender is displayed using the corresponding recipient PC device which preferably replaces the avatar of the sender. Further, a certification logo or text is displayed using the corresponding recipient PC device to visually demonstrate to the recipient that the sender's identity has been verified by the present invention. This way, the recipient can feel trust in viewing the content of the electronic SMS message. If the verification certificate includes results that correspond to an unverified sender, the present invention further provides the recipient to block the electronic SMS message and/or the unverified sender. A stop icon is preferably displayed using the corresponding recipient PC device which serves as a reject/drop function that the recipient account can select to reject and/or block the unverified sender. The unverified sender preferably corresponds to a sender account whose digital certificate could not be verified or results in identity inconsistencies. Furthermore, unauthorized usage of displaying the verification results on the corresponding recipient's PC device is strictly prohibited. In other embodiments, additional functions may be provided to the recipient to perform different actions according to the results of the verification certificate.

Figure 20:
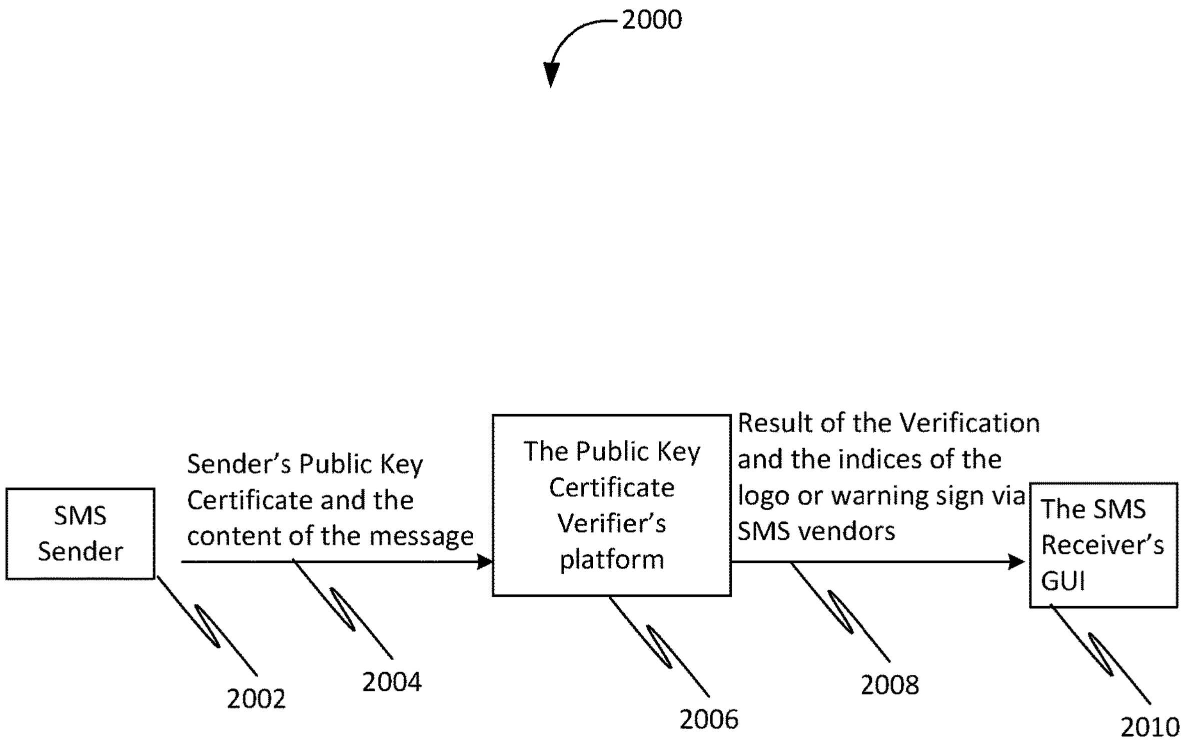
FIG. 20 is a flow chart of a method 2000 where there is a sequence of engagements on the sender's identity verifications and result display systems with its detailed functionalities associated with each of the end to end processes for facilitating secure SMS message, in accordance with some embodiments.

FIG. 20 is a flow chart of a method 2000 for facilitating secure messaging, in accordance with some embodiments. Accordingly, at 2004, the method 2000 may include a public key certificate verifier's platform 2006 receiving a sender's public key certificate and a content of a message from a sender device 2002 such as a personal computer. Further, at 2008, the method 2000 may include the public key certificate verifier's platform 2006 transmitting a result of the verification and indices of a logo or warning sign via SMS vendors to an SMS receiver's GUI 2010. Further, unauthorized usage of displaying the result into the receiver's GUI may be strictly Prohibited.

Figure 21:
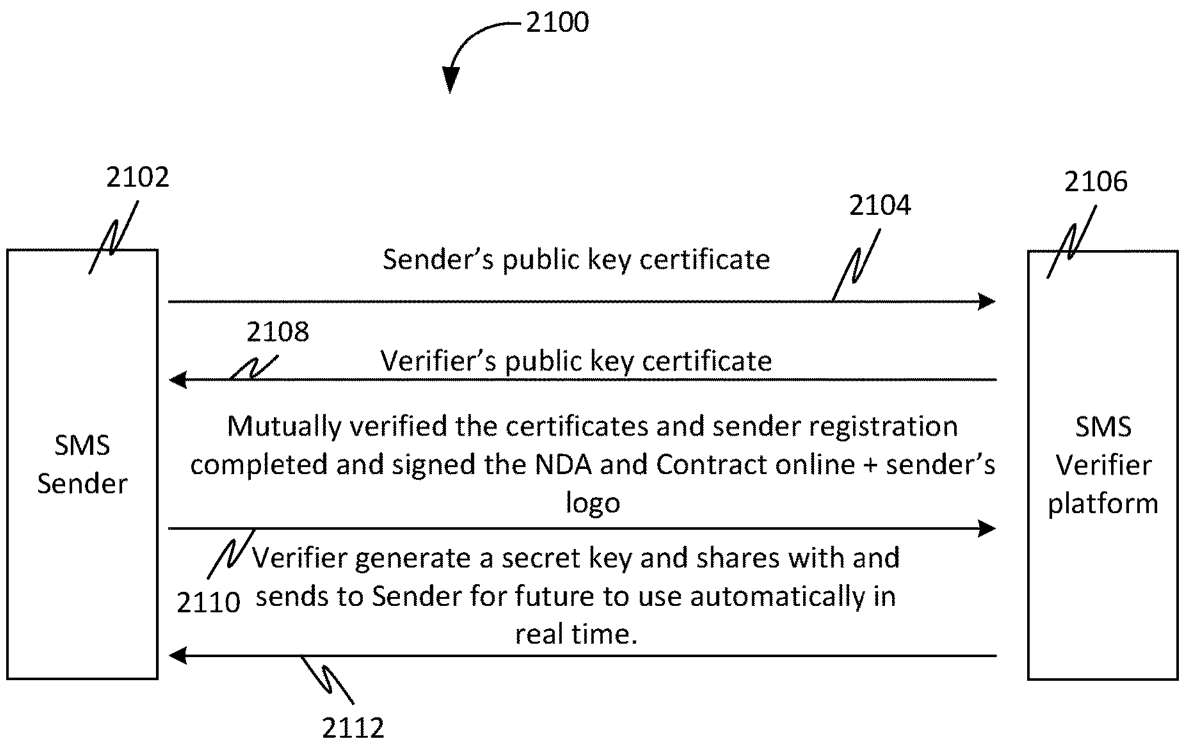
FIG. 21 is a flow diagram of a method 2100 where there are some logical steps for initial enrollment on to the verification platform by the intended, applicable, or potential SMS sender for facilitating registration subprocess of a message sender, in accordance with some embodiments.

FIG. 21 is a flow diagram of a method 2100 for facilitating registration subprocess of a message sender, in accordance with some embodiments. Accordingly, at 2104, the method 2100 may include a sender device 2102 transmitting a sender's public key certificate to a SMS verifier platform 2106 associated with a key certificate verifier. Further, at 2108, the method 2100 may include the SMS verifier platform 2106 transmitting a verifier's public key certificate to the sender device 2102. Further, at 2110, the method 2100 may include mutual certificate verification and completing a sender registration completed. Further, an SMS sender may transmit a signed NDA and contract online and a sender's logo. Further, at 2112, the method 2100 may include the verifier platform 2106 generating a secret key and transmitting an encryption key to the sender device 2102 for future use automatically in real-time.

Figure 22:
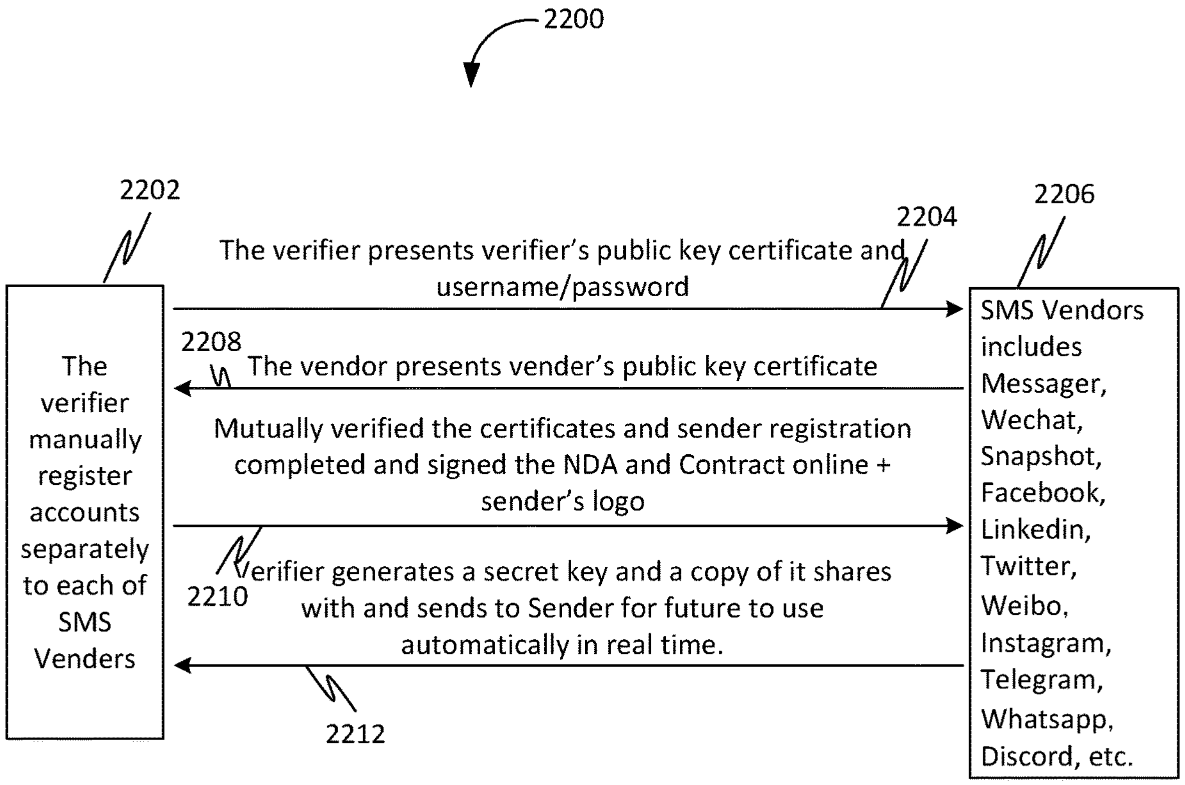
FIG. 22 is a flow diagram of a method 2200 where there are some logical steps for initial enrollment between the verification platform and the intended, applicable, or potential SMS vendor (reader's hosts) for facilitating registration subprocess with messaging vendors, in accordance with some embodiments.

FIG. 22 is a flow diagram of a method 2200 for facilitating registration subprocess with messaging vendors, in accordance with some embodiments. Accordingly, at 2204, the method 2200 may include a verifier 2202 manually registering accounts separately to each of SMS vendor. Further, at 2204, the method 2200 may include the verifier presenting a verifier's public key certificate and a username/password to an SMS vendor 2206 (such as WhatsApp™, Wechat™, Snapshot™, Facebook™, Linkedin™, Twitter™, etc.) Further, at 2208, the method 2200 may include the vendor 2206 presenting a vendor's public key certificate to the verifier 2202. Further, at 2210, the method 2200 may include mutual certificate verification and completing sender registration. Further, the method 2200 may include the vendor transmitting an NDA, a contract, and a sender's logo to the remote server 2202. Further, at 2212, the method 2200 may include the verifier generating a secret key and sharing a copy of the secrete key with the sender for future to use automatically in real-time.

Figure 23:
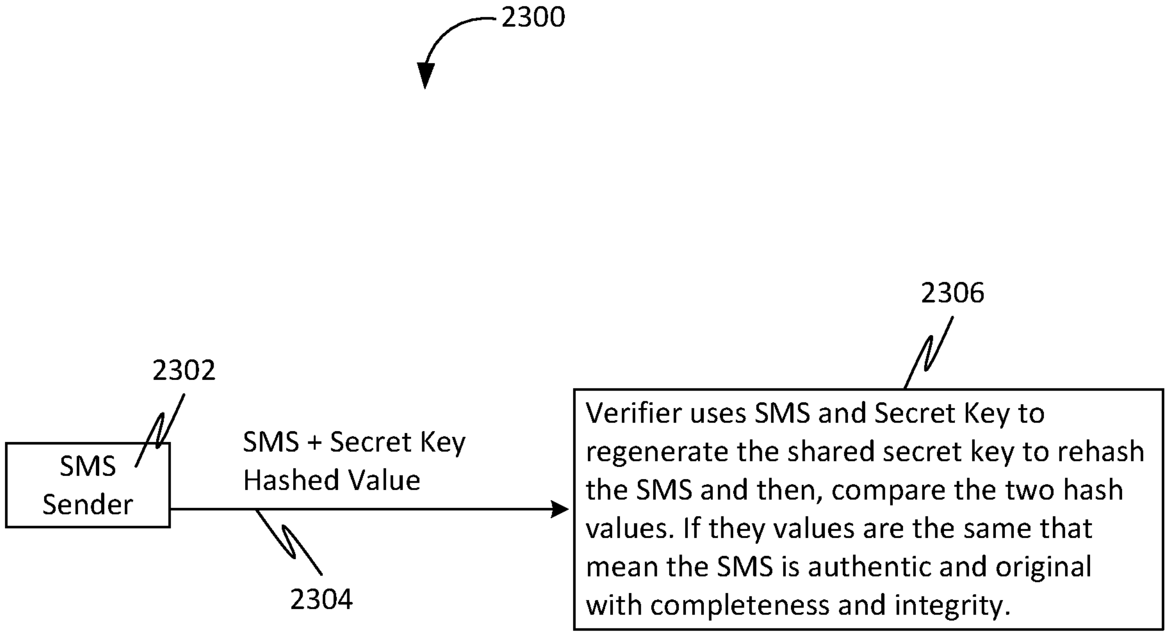
FIG. 23 is a flow diagram of a method 2300 where there are some logical steps for the verification of the SMS message's integrity via using secret key to hash and rehash again for comparison on the verification platform by the verifier to proof the integrity of SMS message for facilitating secure messaging, in accordance with some embodiments.

FIG. 23 is a flow diagram of a method 2300 for facilitating secure messaging, in accordance with some embodiments. Accordingly, at 2304, the method 2300 may include an SMS sender 2302 transmitting an SMS and secret key hashed value to a verifier 2306. Further, the verifier 2306 uses the SMS and the secret Key to regenerate a shared secret key to rehash the SMS and then, compare the two hash values. If the two hash values are the same that means the SMS is authentic and original with completeness and integrity.

Further, when the manual registration of the sender has been completed, the verifier may issue a copy of the secret key and send the secret key to the sender for future usage dynamically.

Figure 24:
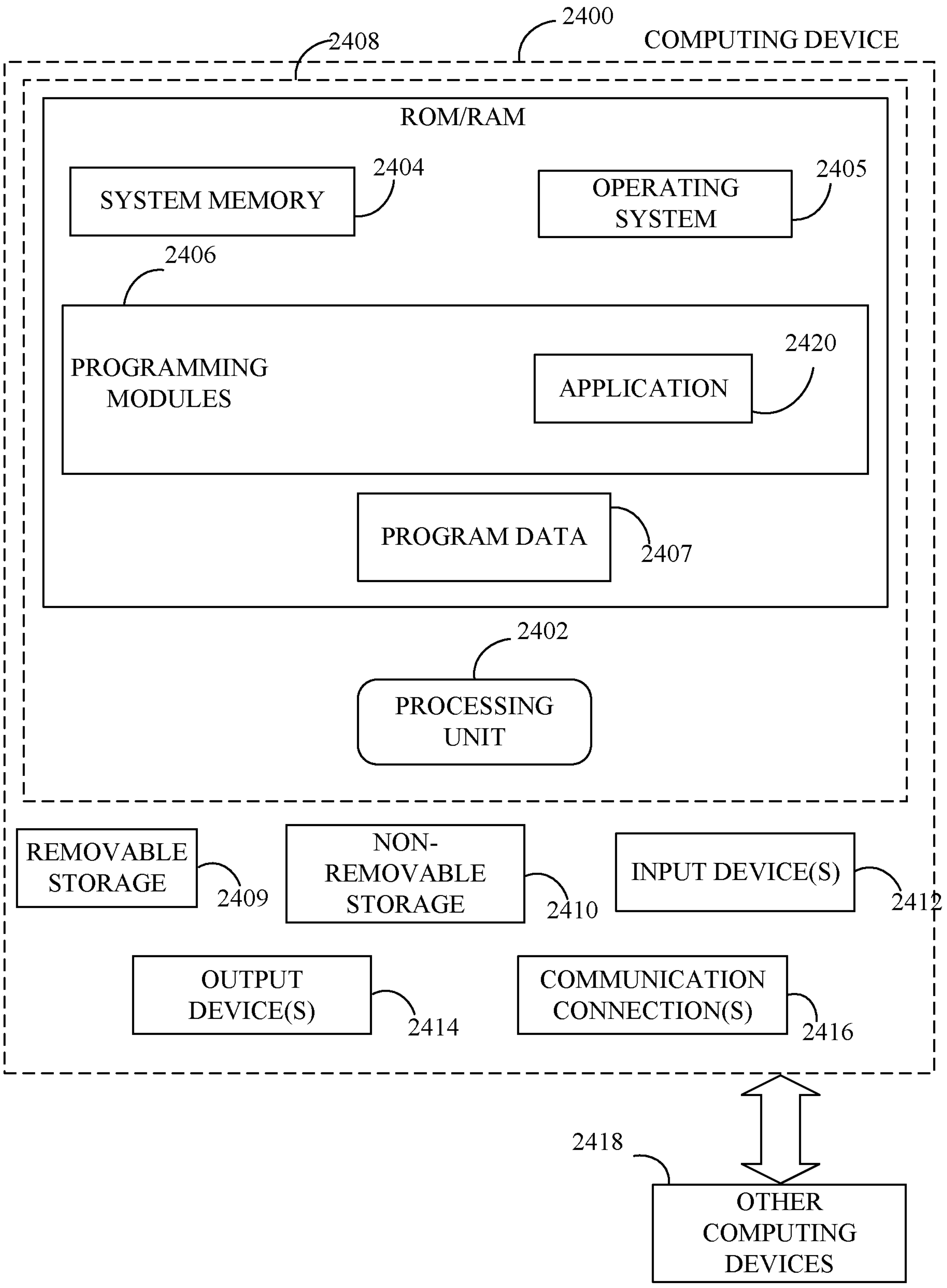
FIG. 24 is a block diagram of a computing device list with its description of the functions of each of the devices for implementing the methods disclosed herein, in accordance with some embodiments.

With reference to FIG. 24, a system consistent with an embodiment of the disclosure may include a computing device or cloud service, such as computing device 2400. In a basic configuration, computing device 2400 may include at least one processing unit 2402 and a system memory 2404. Depending on the configuration and type of computing device, system memory 2404 may comprise, but is not limited to, volatile (e.g. random-access memory (RAM)), non-volatile (e.g. read-only memory (ROM)), flash memory, or any combination. System memory 2404 may include operating system 2405, one or more programming modules 2406, and may include a program data 2407. Operating system 2405, for example, may be suitable for controlling computing device 2400's operation. In one embodiment, programming modules 2406 may include image-processing module, machine learning module. Furthermore, embodiments of the disclosure may be practiced in conjunction with a graphics library, other operating systems, or any other application program and is not limited to any particular application or system. This basic configuration is illustrated in FIG. 24 by those components within a dashed line 2408.

Computing device 2400 may have additional features or functionality. For example, computing device 2400 may also include additional data storage devices (removable and/or non-removable) such as, for example, magnetic disks, optical disks, or tape. Such additional storage is illustrated in FIG. 24 by a removable storage 2409 and a non-removable storage 2410. Computer storage media may include volatile and non-volatile, removable and non-removable media implemented in any method or technology for storage of information, such as computer-readable instructions, data structures, program modules, or other data. System memory 2404, removable storage 2409, and non-removable storage 2410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2400. Any such computer storage media may be part of device 2400. Computing device 2400 may also have input device(s) 2412 such as a keyboard, a mouse, a pen, a sound input device, a touch input device, a location sensor, a camera, a biometric sensor, etc. Output device(s) 2414 such as a display, speakers, a printer, etc. may also be included. The aforementioned devices are examples and others may be used.

Computing device 2400 may also contain a communication connection 2416 that may allow device 2400 to communicate with other computing devices 2418, such as over a network in a distributed computing environment, for example, an intranet or the Internet. Communication connection 2416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2404, including operating system 2405. While executing on processing unit 2402, programming modules 2406 (e.g., application 2420) may perform processes including, for example, one or more stages of methods, algorithms, systems, applications, servers, databases as described above. The aforementioned process is an example, and processing unit 2402 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 25:
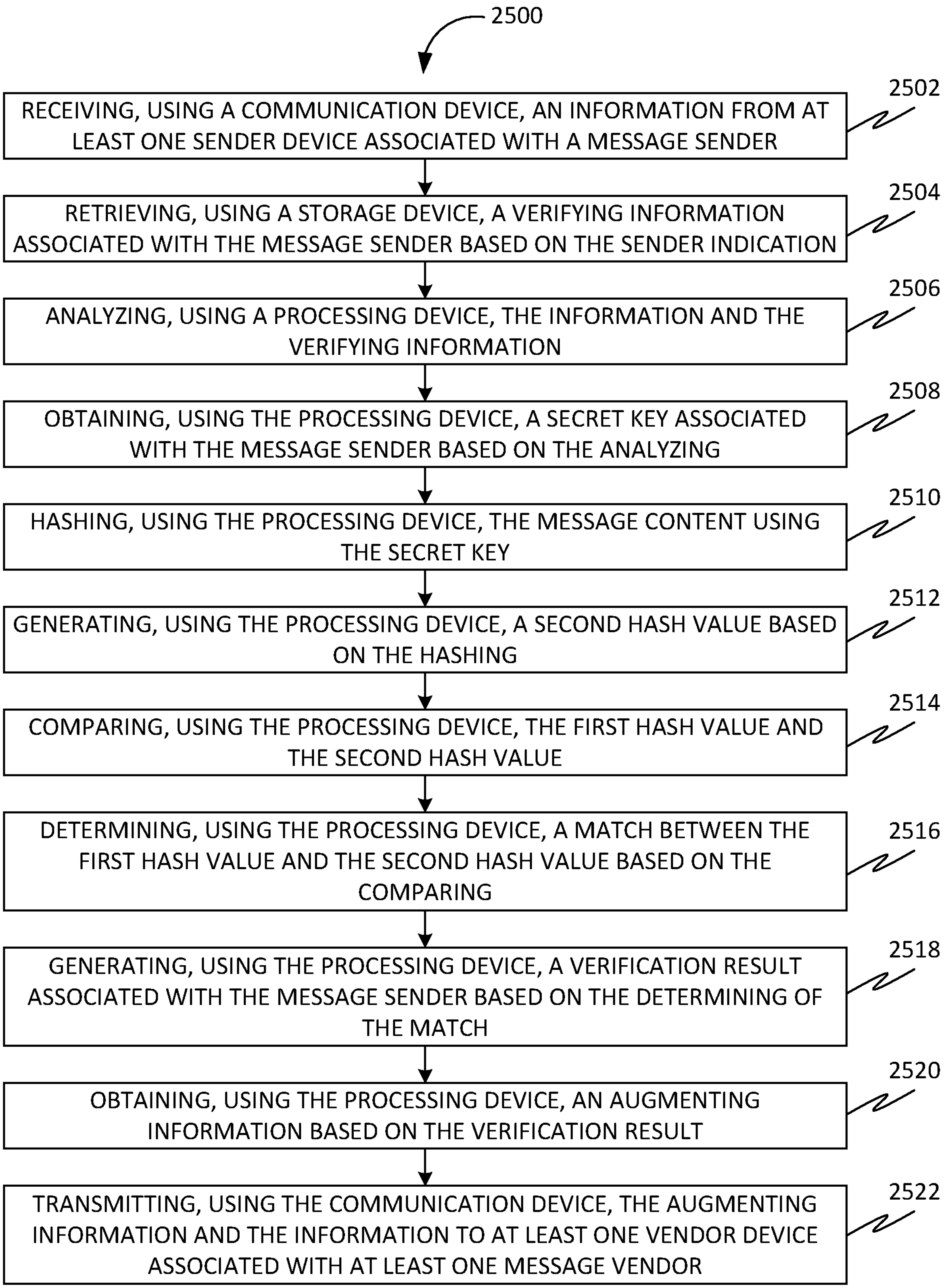
FIG. 25 is a flow chart of a method 2500 where it presents high level details of each of every subprocesses in a sequence with its logical order of facilitating secure messaging, in accordance with some embodiments.

FIG. 25 is a flow chart of a method 2500 of facilitating secure messaging, in accordance with some embodiments. Accordingly, at 2502, the method 2500 may include receiving, using a communication device, an information from at least one sender device associated with a message sender. Further, the information may include a sender indication and identification associated with the message sender. Further, the information may include a message content and a first hash value associated with a message. Further, at 2504, the method 2500 may include retrieving, using a storage device, a verifying information associated with the message sender based on the sender indication and identification. Further, at 2506, the method 2500 may include analyzing, using a processing device, the information and the verifying information.

Further, in some embodiments, the analyzing the information and the verifying information comprises analyzing the information and the verifying information using at least one machine learning model. Further, the at least one machine learning model may be configured for extracting at least one verification feature from the verifying information. Further, the at least one machine learning model may be configured for determining a presence of the at least one verification feature in the information. Further, generating of a verification result may be based on the determining of the presence of the at least one verification feature in the information. Further, the at least one verification feature may include at least one of a sender name, a company or department associated with the sender, a serial number or IP address associated with the at least one sender device, a validity duration, a domain certificate, etc.

Further, in some embodiments, the at least one machine learning model may include a support vector machine (SVM) learning model. Further, the SVM learning model may be trained using a training dataset comprising an information and a classification of at least one verification feature associated with the information. Further, at 2508, the method 2500 may include obtaining, using the processing device, a secret key associated with the message sender based on the analyzing. Further, at 2510, the method 2500 may include hashing, using the processing device, the message content using the secret key. Further, at 2512, the method 2500 may include generating, using the processing device, a second hash value based on the hashing. Further, at 2514, the method 2500 may include comparing, using the processing device, the first hash value and the second hash value. Further, at 2516, the method 2500 may include determining, using the processing device, a match between the first hash value and the second hash value based on the comparing. Further, at 2518, the method 2500 may include generating, using the processing device, a verification result associated with the message sender based on the determining of the match. Further, the verification result may include one of a successful verification result indicating a successful verification of the message sender and an unsuccessful verification result indicating an unsuccessful verification of the message sender. Further, at 2520, the method 2500 may include obtaining, using the processing device, an augmenting information based on the verification result. Further, at 2522, the method 2500 may include transmitting, using the communication device, the augmenting information and the information to at least one vendor device associated with at least one message vendor. Further, the at least one vendor device may be configured for augmenting, using a vendor processing device of the at least one vendor device, a graphic user interface based on the augmenting information. Further, in some embodiments, the augmenting of the graphic user interface may include augmenting the graphic user interface using at least one first machine learning model. Further, the augmenting of the graphic user interface using the at least one first machine learning model may include analyzing at least one display information associated with the at least one vendor device and the augmenting information using the at least one first machine learning model. Further, the augmenting of the graphic user interface using the at least one first machine learning model may include determining at least one value of at least one display parameter (resolution, display area, display screen size, pixel density, refresh rate, etc.) of the at least one vendor device and at least one information parameter (image size, image dimension, matrix, pixels, voxels, and bit depth) of the augmenting information using the at least one first machine learning model based on the analyzing of the at least one display information and the augmenting information. Further, the augmenting of the graphic user interface using the at least one first machine learning model may include modifying a current value for the at least one information parameter to a modified value of the at least one information parameter the at least one value of the at least one display parameter using the at least one first machine learning model based on the determining of the at least one value of the at least one display parameter. Further, the augmenting of the graphic user interface using the at least one first machine learning model may include incorporating the augmenting information with the current value for the at least one information parameter in the graphic user interface using the at least one first machine learning model. Further, the generating of an augmented graphic user interface may be based on the incorporating. Further, the graphic user interface may include one or more modifiable sections and one or more non modifiable sections. Further, the at least one vendor device may be configured for generating, using the vendor processing device, the augmented graphic user interface based on the augmenting. Further, the augmented graphic user interface may include the one or more modifiable sections with one or more augmenting content. Further, the at least one vendor device may be configured for transmitting, using a vendor communication device of the at least one vendor device, the augmented graphic user interface to at least one receiver device associated with at least one message receiver. Further, the at least one receiver device may be configured for presenting the augmented graphic user interface.

Although the present disclosure has been explained in relation to its preferred embodiment, it is to be understood that many other possible modifications and variations can be made without departing from the spirit and scope of the disclosure.

The following is claimed:

1. A method of facilitating secure messaging, the method comprising:

receiving, using a communication device, an information from at least one sender device associated with a message sender, wherein the information comprises a sender's identification associated with the message sender, wherein the information comprises a message content and a first hash value associated with a message;

retrieving, using a storage device, a verifying information associated with the message sender based on the sender identification;

analyzing, using a processing device, the information and the verifying information;

generating, using the processing device, a secret key associated with the message sender based on the analyzing;

storing a copy of the secret key on each of the sender device and a remote server;

transmitting, using the communication device, the message content and the first hash value to the remote server, wherein the first hash value is generated based on the hashing of the message content using the copy of the secret key stored on the sender device;

hashing, using the processing device, the message content using the copy of the secret key stored on the remote server;

generating, using the processing device, a second hash value based on the hashing;

comparing, using the processing device, the first hash value and the second hash value;

determining, using the processing device, a match between the first hash value and the second hash value based on the comparing;

generating, using the processing device, a verification result associated with the message sender based on the determining of the match;

obtaining, using the processing device, an augmenting information based on the verification result; and transmitting, using the communication device, the augmenting information and the information to at least one vendor device associated with at least one message vendor, wherein the at least one vendor device is configured for:

augmenting, using a vendor processing device of the at least one vendor device, a graphic user interface based on the augmenting information;

generating, using the vendor processing device, an augmented graphic user interface, and transmitting the augmented graphic user interface to at least one receiver device associated with at least one message receiver, wherein the at least one receiver device is configured for presenting the augmented graphic user interface.

2. The method of claim 1, wherein the graphic user interface comprises one or more modifiable sections and one or more non modifiable sections, wherein the augmenting the graphic user interface (GUI) comprises augmenting the one or more modifiable sections with one or more augmenting content comprised in the augmenting information.

3. The method of claim 2, wherein the verification result comprises a successful verification result indicating a successful verification of the message sender, wherein the one or more augmenting content associated with the successful verification result comprises at least one of a verification badge and a logo associated with the message sender, wherein the augmenting of the graphic user interface is further based on at least one of the verification badge and the logo.

4. The method of claim 2, wherein the verification result comprises an unsuccessful verification result indicating an unsuccessful verification of the message sender, wherein the one or more augmenting content associated with the unsuccessful verification result comprises at least one of an unverified badge and a warning symbol, wherein the augmenting of the graphic user interface (GUI) is further based on the unverified badge and the warning symbol.

* * * * *